United States Patent
Kesiraju et al.

(10) Patent No.: US 10,846,091 B2
(45) Date of Patent: Nov. 24, 2020

(54) COPROCESSOR WITH DISTRIBUTED REGISTER

(71) Applicant: Apple Inc., Cupertino, CA (US)

(72) Inventors: Aditya Kesiraju, Los Gatos, CA (US); Andrew J. Beaumont-Smith, Cambridge, MA (US); Deepankar Duggal, Sunnyvale, CA (US); Ran A. Chachick, Providence, RI (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 16/286,213

(22) Filed: Feb. 26, 2019

(65) Prior Publication Data

US 2020/0272467 A1    Aug. 27, 2020

(51) Int. Cl.
  *G06F 9/345* (2018.01)
  *G06F 9/38* (2018.01)
  *G06F 9/30* (2018.01)
  *G06F 12/0802* (2016.01)
  *G06F 9/48* (2006.01)

(52) U.S. Cl.
  CPC ............ *G06F 9/345* (2013.01); *G06F 9/3001* (2013.01); *G06F 9/30043* (2013.01); *G06F 9/3824* (2013.01); *G06F 9/3838* (2013.01); *G06F 9/3877* (2013.01); *G06F 9/4881* (2013.01); *G06F 12/0802* (2013.01)

(58) Field of Classification Search
  CPC ...... G06F 9/3877; G06F 9/345; G06F 9/3824; G06F 9/3838; G06F 9/30043; G06F 9/3001; G06F 12/0802; G06F 9/4881; G06F 15/16
  See application file for complete search history.

(56) References Cited

U.S. PATENT DOCUMENTS

| 6,334,179 | B1 * | 12/2001 | Curran ................... G06F 9/321 712/34 |
| 6,510,510 | B1 * | 1/2003 | Garde ................. G06F 9/30036 712/218 |
| 6,845,445 | B2 * | 1/2005 | Marchand ............. G06F 1/3203 710/18 |
| 10,228,869 | B1 * | 3/2019 | Nakibly ................ G06F 9/5038 |
| 2006/0212678 | A1 | 9/2006 | De Oliveira Kastrup Pereira |
| 2014/0040551 | A1 * | 2/2014 | Blainey ................. G06F 9/3842 711/122 |
| 2018/0032312 | A1 | 2/2018 | Hansen et al. |

* cited by examiner

*Primary Examiner* — Farley Abad
(74) *Attorney, Agent, or Firm* — Kowert, Hood, Munyon, Rankin & Goetzel, P.C.; Lawrence J. Merkel

(57) ABSTRACT

In an embodiment, a coprocessor includes multiple processing elements arranged in a grid of one or more rows and one or more columns. A given processing element includes an arithmetic/logic unit (ALU) circuit configured to perform an ALU operation specified by an instruction executable by the coprocessor, wherein the ALU circuit is configured to produce a result. The given processing element further comprises a first memory coupled to the execute circuit. The first memory is configured to store results generated by the given processing element. The first memory includes a portion of a result memory implemented by the coprocessor, wherein locations in the result memory are specifiable as destination operands of instructions executable by the coprocessor. The portion of the result memory implemented by the first memory is the portion of the result memory that the given processing element is capable of updating.

20 Claims, 18 Drawing Sheets

| Op Type | Rows Read/Written | HazardMask |
|---|---|---|
| FP64 | 8 (Every 8$^{th}$ Row) | 000111 |
| FP32, ExtrY32 | 16 (Every 4$^{th}$ Row) | 000011 |
| FP16, MAC 16 w 16, ExtrY 16 | 32 (Every 2$^{nd}$ Row) | 000001 |
| FP16, MAC 16 w 32 | 64 (Every Row) | 000000 |
| LoadZ/StoreZ/ExtrX | 1 | 111111 |
| LoadZI/StoreZI | 2 adjacent | 111110 |
| Vector Slice | 1 | 111111 |

— 70

Hazard(Op1, Op2) = [Op1.DestID & Op1.HazardMask & Op2.HazardMask] ==
 [Op2.DestID & Op1.HazardMask & Op2. HazardMask]

72

| Op Type | Rows Read/Written | HazardMask |
|---|---|---|
| FP64 | 8 (Every 8$^{th}$ Row) | 000111 |
| FP32, ExtrY32 | 16 (Every 4$^{th}$ Row) | 000011 |
| FP16, MAC 16 w 16, ExtrY 16 | 32 (Every 2$^{nd}$ Row) | 000001 |
| FP16, MAC 16 w 32 | 64 (Every Row) | 000000 |
| LoadZ/StoreZ/ExtrX | 1 | 111111 |
| LoadZI/StoreZI | 2 adjacent | 111110 |
| Vector Slice | 1 | 111111 |

— 70

Hazard(Op1, Op2) = [Op1.DestID & Op1.HazardMask & Op2.HazardMask] ==
 [Op2.DestID & Op1.HazardMask & Op2.HazardMask]

| Z Operand Size | Z Rows | Banks/Row | ZRowMask |
|---|---|---|---|
| 64 | 8 | 8 | 10000000 >> bank number |
| 32 | 16 | 4 | 10001000 >> bank number |
| 16 | 32 | 2 | 10101010 >> bank number |
| 8 | 64 | 1 | 11111111 |

— 74

Matrix
PERowMask=111111111

78

Vector
PERowMask=10000000 >> Row Number

Hazard(Op1, Op2) = BitwiseOR(Op1.PERowMask & Op2.PERowMask) &
    BitwiseOR(Op1.ZRowMask & Op2.ZRowMask)

76

US 10,846,091 B2

COPROCESSOR WITH DISTRIBUTED REGISTER

BACKGROUND

Technical Field

Embodiments described herein are related to coprocessors and, more particularly, to operand storage in coprocessors.

Description of the Related Art

Processors are a critical component of many digital systems, often determining how much performance and/or power efficiency can be achieved in the system. In some cases, a subset of the instruction set implemented by the processors can be implemented in a coprocessor that can be higher performance and/or more efficient at executing the subset of the instructions than the processor. Alternatively, instructions can be added to the instruction set that are specifically designed to be executed by the coprocessor, using specialized hardware that a general purpose processor would not implement.

The coprocessor can have a specified register set/memory that is used to store operands for the coprocessor and results generated by the coprocessor. Efficiently implementing the operand/result storage can be an important feature of the coprocessor.

SUMMARY

In an embodiment, a coprocessor includes multiple processing elements arranged in a grid of one or more rows and one or more columns. A given processing element includes an arithmetic/logic unit (ALU) circuit configured to perform an ALU operation specified by an instruction executable by the coprocessor, wherein the execute circuit is configured to produce a result. The given processing element further comprises a first memory coupled to the execute circuit. The first memory is configured to store results generated by the given processing element. The first memory includes a portion of a result memory implemented by the coprocessor, wherein locations in the result memory are specifiable as destination operands of instructions executable by the coprocessor. The portion of the result memory implemented by the first memory is the portion of the result memory that the given processing element is capable of updating. In an embodiment, the ALU circuit is a multiply-accumulate circuit configured to multiply first input operands and sum a result of the multiplication with a second input operand responsive to an instruction issued to the plurality of processing elements.

BRIEF DESCRIPTION OF THE DRAWINGS

The following detailed description makes reference to the accompanying drawings, which are now briefly described.

FIG. 8 is a block diagram illustrating Z memory hazarding for one embodiment of the execute circuits shown in FIGS. 5 to 7.

Figure 1:
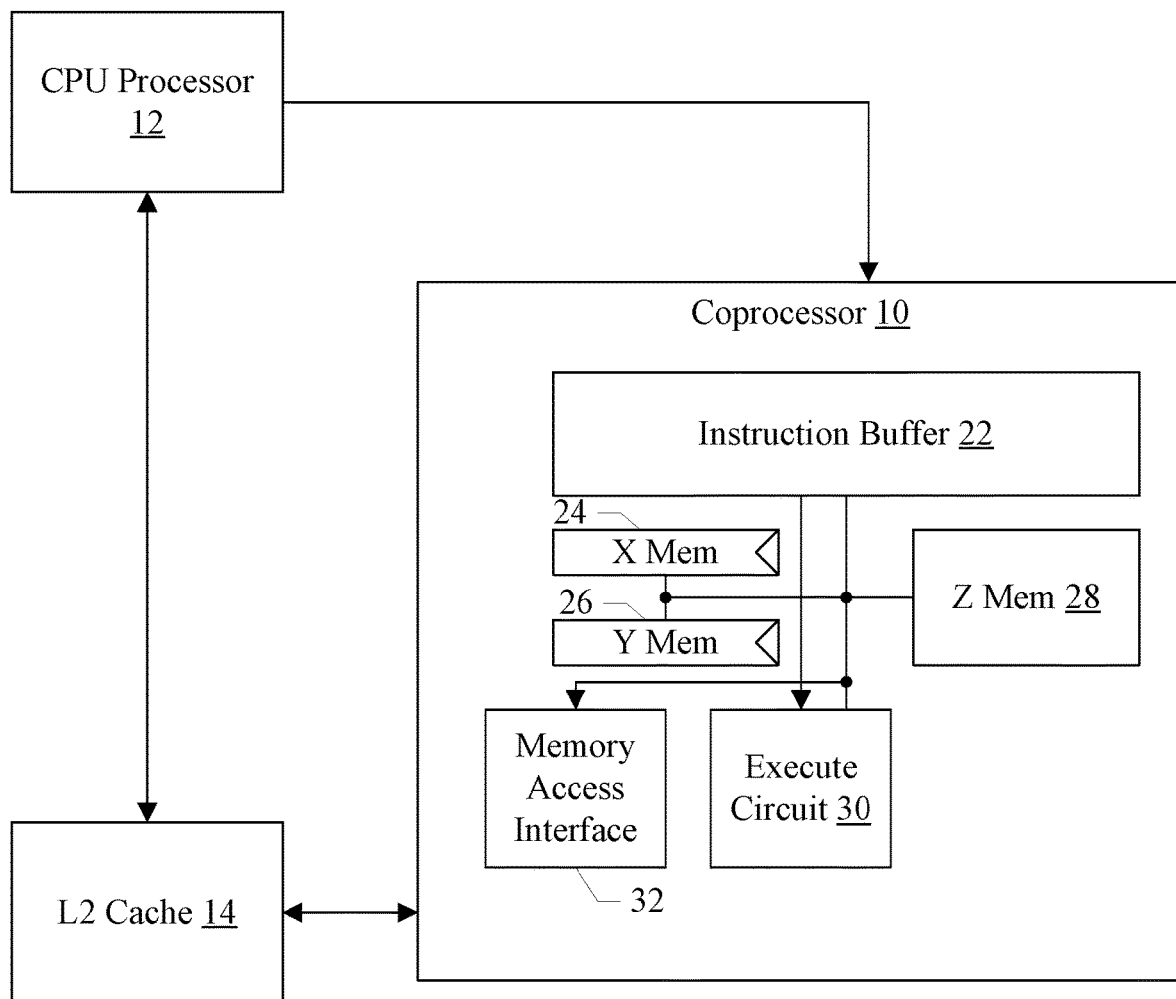
FIG. 1 is a block diagram illustrating one embodiment of a processor and a coprocessor.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, to inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B.

As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

Turning now to FIG. 1, a block diagram of one embodiment of an apparatus including a CPU processor 12, a coprocessor 10, and a level two (L2) cache 14 is shown. In the illustrated embodiment, the CPU processor 12 is coupled to the L2 cache 14 and the coprocessor 10. In some embodiments, the coprocessor 10 may be coupled to the L2 cache 14 as well, and/or may be coupled to a data cache (DCache) in the CPU processor 12 (not shown in FIG. 1). The coprocessor 10 may include an instruction buffer 22, an X memory 24, a Y memory 26, a Z memory 28, an execute circuit 30, and a memory access interface 32 coupled to each other. In some embodiments, circuits may be coupled if they are electrically coupled (e.g. directly connected or indirectly connected through one or more other circuits) and/or communicatively coupled.

The coprocessor 10 may be configured to perform one or more computation operations and one or more coprocessor load/store operations. The coprocessor 10 may employ an instruction set, which may be a subset of the instruction set implemented by the CPU processor 12. The CPU processor 12 may recognize instructions implemented by the coprocessor 10 and may communicate the instructions to the coprocessor 10. Any mechanism for transporting the coprocessor instructions from the processor 12 to the coprocessor 10 may be used. For example, FIG. 1 illustrates a communication path between the CPU processor 12 and the coprocessor 10. The path may be a dedicated communication path, for example if the coprocessor 10 is physically located near the CPU processor 12. The communication path may be shared with other communications. For example, a packet-based communication system could be used to transmit memory requests to the system memory and instructions to the coprocessor 10. In one particular embodiment, coprocessor instructions may be communicated through the L2 cache 14 to the coprocessor 12. In an embodiment, instructions may be bundled and transmitted to the coprocessor 12. For example, cache operations, cache evictions, etc. may be transmitted by the processor 12 to the L2 cache 14, and thus there may be an interface to transmit an operation and a cache line of data. The same interface may be used, in an embodiment, to transmit a bundle of instructions to the coprocessor 10 through the L2 cache 14.

In one embodiment, the computation operations specified by the instructions implemented in the coprocessor 10 may be performed on vectors of input operands. For example, an embodiment receives vectors of operands from the X memory 24 and the Y memory 26. The execute circuit 30 may include an array or grid of processing elements (circuits) to perform the operations. Each circuit may receive one or more of the vector of elements from the X memory 24 and one or more of the vector of elements from the Y memory 26, and may evaluate the operation on the vector elements. In an embodiment, the result of the operation may be accumulated with the current value in a corresponding location in the Z memory 28, for write back to the corresponding location in the Z memory 28. In an embodiment, the instructions executed by the coprocessor 10 may have a vector mode and a matrix mode. In the vector mode, each vector element of X is evaluated against a corresponding vector element of Y, producing a vector of results. In the matrix mode, an outer product of the input vector operands may be computed in one embodiment. In still another embodiment, various matrix operations may be supported using in the matrix mode, and each vector element of X may be operated upon with each vector element of Y in the matrix mode.

Based on the location of a given processing element in the array, there is a subset of the Z memory 28 that the processing element may update in response to coprocessor instructions. That is, each processing element produces a portion of the overall result of an instruction. The result produced over all of the processing elements (or a subset of the processing elements, if an instruction specifies fewer than all of the processing elements to perform an operation) is the result of the instruction, and the result is written to locations in the Z memory that are dispersed over the address space of the Z memory in a regular pattern that depends on the instruction and the operand size of the instruction. Up to all of the Z memory 28 may be updated in response to an instruction, but each processing element updates a restricted portion of the Z memory 28 (and that processing element may be the only processing element in the execute circuit 30 that may update the restricted portion). The instruction may specify a Z memory address for the result, and the address identifies the location(s) within the restricted portion that are updated.

In one embodiment, the Z memory 28 may thus be physically distributed over an area of the integrated circuit that is occupied by the coprocessor 10, along with the processing elements of the execute circuit 30. Thus, the depiction in FIG. 1 may be a logical diagram of the coprocessor 10, and the physical implementation may include distributing the Z memory 28 with the processing elements. Physically distributing the Z memory 28 may provide various benefits, in some embodiments. For example, the wiring to connect the Z memory 28 to the processing elements in the execute circuit 30 may be relatively short and compact as compared to if the Z memory 28 were implemented separately. This may lead to savings in area consumed, as well as power in reading and writing the Z memory 28.

In an embodiment, the coprocessor 10 may support various data types and data sizes (or precisions). For example, floating point and integer data types may be supported. The floating point data type may include 16 bit, 32 bit, and 64 bit precisions. The integer data types may include 8 bit and 16 bit precisions, and both signed and unsigned integers may be supported. Other embodiments may include a subset of the above precisions, additional precisions, or a subset of the above precisions and additional precisions (e.g. larger or smaller precisions). In an embodiment, 8 bit and 16 bit precisions may be supported on input operands, and 32 bit accumulations may be supported for the results of operating on those operands.

In an embodiment, the coprocessor load operations may transfer vectors from a system memory (not shown in FIG. 1) to the X memory 24, Y Memory 26, or Z memory 28. The coprocessor store operations may write the vectors from the X and Y memories 24 and 26 to system memory. The Z memory 28 may be written to memory using an extract instruction to move the results to the X memory 24 and/or the Y memory 26, and then storing the results from the X memory 24 and/or the Y memory 26 to system memory. Alternatively, a store instruction to store the Z memory 28 to main memory may also be supported. The system memory may be formed from a random access memory (RAM) such as various types of dynamic RAM (DRAM) or static RAM (SRAM). A memory controller may be included to interface to the system memory. In an embodiment, the coprocessor 10 may be cache coherent with the CPU processor 12. In an embodiment, the coprocessor 10 may have access to the L2 cache 14, and the L2 cache 14 may ensure cache coherency with the CPU processor 12 caches. In yet another alternative, the coprocessor 10 may have access to the memory system, and a coherence point in the memory system may ensure the coherency of the accesses. In yet another alternative, the coprocessor 10 may have access to the CPU caches. In still another embodiment, the coprocessor 10 may have one or more caches (which may be virtually addressed or physically addressed, as desired). The coprocessor caches may be used if an L2 cache 14 is not provided and access to the CPU caches is not provided. Alternatively, the coprocessor 10 may have the caches and access to the L2 cache 14 for misses in those caches. Any mechanism for accessing memory and ensuring coherency may be used in various embodiments.

The CPU processor 12 may be responsible for fetching the instructions executed by the CPU processor 12 and the coprocessor 10, in an embodiment. In an embodiment, the coprocessor instructions may be issued by the CPU processor 12 to the coprocessor 10 when they are no longer speculative. Generally, an instruction or operation may be non-speculative if it is known that the instruction is going to complete execution without exception/interrupt. Thus, an instruction may be non-speculative once prior instructions (in program order) have been processed to the point that the prior instructions are known to not cause exceptions/speculative flushes in the CPU processor 12 and the instruction itself is also known not to cause an exception/speculative flush. Some instructions may be known not to cause exceptions based on the instruction set architecture implemented by the CPU processor 12 and may also not cause speculative flushes. Once the other prior instructions have been determined to be exception-free and flush-free, such instructions are also exception-free and flush-free.

The instruction buffer 22 may be provided to allow the coprocessor 10 to queue instructions while other instructions are being performed. In an embodiment, the instruction buffer 22 may be a first in, first out buffer (FIFO). That is, instructions may be processed in program order. Other embodiments may implement other types of buffers, multiple buffers for different types of instructions (e.g. load/store instructions versus compute instructions) and/or may permit out of order processing of instructions.

The X memory 24 and the Y memory 26 may each be configured to store at least one vector of input operands.

Similarly, the Z memory 28 may be configured to store at least one computation result generated from a vector of operands from the X memory 24 and a vector of operands from the Y memory 26. The result may be a matrix of results at the result size (e.g. 16 bit elements, 32 bit elements, or 64 bit elements). Alternatively, the result may be a vector, depending on the instruction. In some embodiments, the X memory 24 and the Y memory 26 may be configured to store multiple vectors and/or the Z memory 28 may be configured to store multiple result matrices/vectors. Each vector/matrix may be stored in a different bank in the memories, and operands for a given instruction may be identified by bank number. More generally, each entry in the memories 24, 26, and 28 may be addressed by a register address (e.g. register number) and thus the entries in the memories may be viewed as registers, similar to an integer or floating point register in the CPU processor 12 (although generally significantly larger than such a register in terms of storage capacity). Viewed in another way, each of the memories 24, 26, and 28 may be addressable as entries using addresses that are referenced to the particular memory (e.g. each memory 24, 26, and 28 may have its own address space). A given address of a given entry in the X memory 24, for example, may have the same numerical value as a second given address of a second given entry in the Y memory 26. Because they are coded in a given instruction as an X memory address or a Y memory address, the correct entry from the correct memory to be read/written may be selected by the coprocessor 10.

The execute circuit 30 may be configured to perform the computation operations, as previously mentioned. The memory access interface 32 may be configured to perform the coprocessor load/store operations. The coprocessor 10 may provide the coprocessor load/store operations from the instruction buffer 22 to the memory access interface 32, which may include a queue for the load/store operations and control logic to select the load/store operations for execution. The address of the coprocessor load/store operations may be provided with the operation from the CPU processor 12. In one embodiment, the CPU processor 12 may generate a virtual address from one or more address operands of the load/store operation, and may translate the virtual address to a physical address through a memory management unit (e.g. a translation lookaside buffer (TLB) and/or related hardware). In another embodiment, the coprocessor 10 may include a TLB and/or other MMU hardware, and the CPU processor 12 may provide a virtual address which may be translated by the coprocessor 10. TLB management instructions executed by the CPU processor 12 may also be transmitted to the coprocessor 10 in such embodiments, to manage the coprocessor 10 TLB coherently with the CPU processor 12 TLB. However, for coprocessor store operations, the source data from one of the memories 24, 26, and 28 may not be available until prior compute operations have been completed. Coprocessor load operations may generally be ready for execution when provided to the memory access interface 32, but may have ordering constraints with younger coprocessor load/store operations. The memory access interface 32 may be configured to resolve the ordering constraints and transmit the memory operations to the L2 cache 14.

In an embodiment, the L2 cache 14 may be configured to check for a cache hit for the coprocessor load/store operations, and may also determine if the data (or a portion thereof) accessed by the coprocessor load/store operations is in a data cache in the CPU processor 12. The L2 cache 14 may be inclusive of the CPU processor data cache, and thus the tag for the cache line in the L2 cache 14 may indicate if the cache line is in the data cache. Alternatively, the L2 cache 14 may include a set of tags for the data cache and may track which cache blocks are in the data cache in the set of tags. If the data is in the data cache, the L2 cache 14 may generate an operation to invalidate the data cache line (and fetch the data if it is modified). This operation may be referred to as a "back snoop" operation. Additionally, the L2 cache 14 may detect a cache miss for a coprocessor load/store operation, and may fetch the missing cache line from another lower level cache or the main memory to complete the request.

A cache line may be the unit of allocation/deallocation in a cache. That is, the data within the cache line may be allocated/deallocated in the cache as a unit. Cache lines may vary in size (e.g. 32 bytes, 64 bytes, 128 bytes, or larger or smaller cache lines). Different caches may have different cache line sizes (e.g. the data cache in the CPU processor 12 may have a smaller cache line size than the L2 cache 14, in an embodiment). Each cache may have any desired capacity, cache line size, and configuration. The L2 cache 14 may be any level in the cache hierarchy (e.g. the last level cache (LLC) for the CPU processor 12, or any intermediate cache level between the CPU processor 12/coprocessor 10 and the main memory system). There may be more levels of cache between the CPU caches and the L2 cache 14, and/or there may be additional levels of cache between the L2 cache 14 and the main memory.

It is noted that the coprocessor 10 may be illustrated in simplified form, in an embodiment, and may include additional components not shown in FIG. 1. For example, the coprocessor 10 may include a pipeline to decode coprocessor operations, perform register renaming the operands, use a physical memory size for the X memory 24 and Y memory 26 that is larger than the architected size, and execute computation operations out of order. Any implementation of the coprocessor 10 may be used in various embodiments.

It is noted that, in some embodiments, the coprocessor 10 may be shared by multiple CPU processors 12. The coprocessor 10 may maintain separate contexts in the X memory 24, Y memory 26, and Z memory 28 for each CPU processor 12, for example. Alternatively, contexts may be swapped in the coprocessor 10 when different CPU processors 12 issue coprocessor operations to the coprocessor 10.

Figure 2:
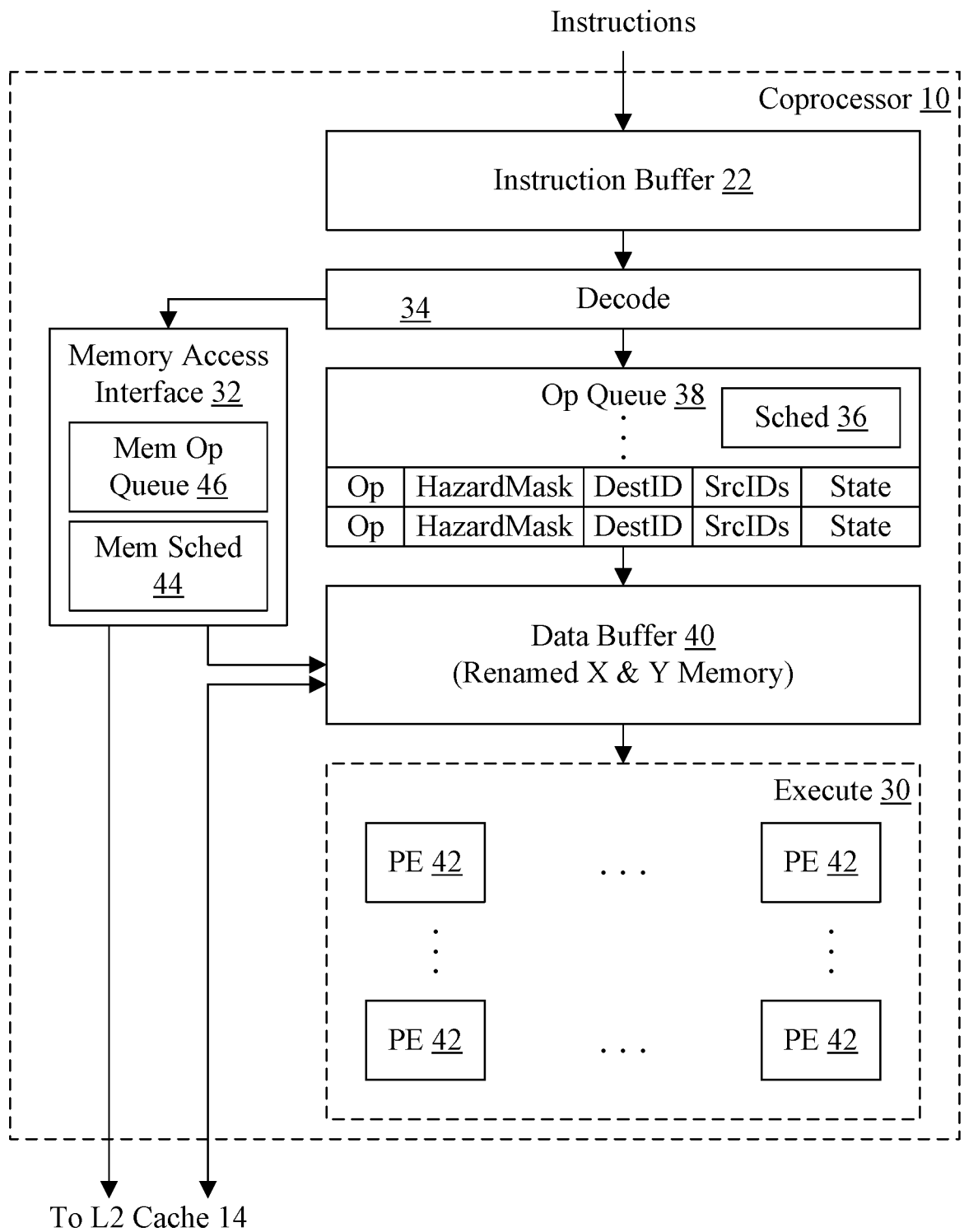
FIG. 2 is a block diagram illustrating one embodiment of the coprocessor in greater detail.

FIG. 2 is a block diagram of one embodiment of the coprocessor 10 in greater detail. In the illustrated embodiment, the coprocessor 10 includes the instruction buffer 22, a decode unit 34, the memory access interface 32, an operation (op) queue 38, a data buffer 40, and the execute circuit 30. The execute circuit 30 includes an array of processing elements (PEs) 42, arranged as a grid of rows and columns. The instruction buffer 22 is coupled to receive instructions to be executed by the coprocessor 10, and is coupled to the decode unit 34. The decode unit 34 is coupled to the op queue 38, which is further coupled to the data buffer 40. The data buffer 40 is coupled to the execute circuit 30. The op queue 38 includes a scheduler circuit 36. The data buffer 40 is coupled to the memory access interface 32, and both the memory access interface 32 and the data buffer 40 are coupled to the L2 cache 14.

Generally, the coprocessor 10 may be configured to receive instructions in the instruction buffer 22. The decode unit 34 may decode the instructions into one or more operations (ops) for execution. The ops may include compute ops that are executed in the execute circuit 30, as well as memory ops to read data from memory into the data buffer 40 and store data from the data buffer 40 to memory (via the L2 cache 14). In one embodiment, the data buffer 40 may be the source of operands for compute ops executed by the execute circuit 30, and results may be stored in the distributed Z memory 28 within the execute circuit 30 (not shown in FIG. 2). That is, the data buffer 40 may include the storage for the X memory 24 and the Y memory 26. The entries from the X memory 24 and the Y memory 26 may be renamed by the decode unit 34 to various entries in the data buffer 40 using register renaming techniques. The Z memory 28 may not be renamed, in this embodiment.

As mentioned previously, the coprocessor 10 may be designed to execute instructions which specify vectors of operands and a compute (arithmetic/logic unit (ALU)) operation to be performed on the operands. For example, various types of multiply/accumulate operations may be supported. The multiplications may be performed in parallel on the vectors of operands. Thus, the execute circuit 30 includes an array of processing elements (PEs) 42. The array of PEs 42 may include a horizontal direction (row) and a vertical direction (column), as illustrated in FIG. 2. Each PE 42 may receive an operand from one or more input vector elements for an op, and may perform the specified compute operation on the operands to produce a result. Some ops may specify a vector of results, and a subset of the PEs 42 may be used for such ops. Other ops may specify an array (or matrix) of results. For example, in an embodiment, the multiply-accumulate operations over the vectors of input operands may produce an outer product of the vectors. Other multiply-accumulate operations may be performed in matrix mode for such embodiments. Up to all of the PEs 42 may be used for matrix-mode ops. However, in some cases, even the array of results may not use all of the PEs 42. For example, in some cases, not all of the vector of input operands may be used.

In an embodiment, for matrix operations, the vector of operands from the Y memory 26 may be provided as a "column" to the execute circuit 30 and the vector of operands from the X memory 24 may be provided as a "row" to the execute circuit 30. Thus, a given vector element from the X memory 24 may be supplied to a column of PEs 42, and a given vector element from the Y memory 26 may be supplied to a row of PEs 42 for a matrix operation. Because different operand sizes are supported, the number of vector elements supplied to a given PE 42 depends on the operand size of the instruction. For example, if the execute circuit 30 has N PEs 42 in a row or column, each PE 42 may receive 1/Nth of the data from an entry. The number of operands in the data, and thus the number of operations performed by the PE 42 for a given instruction, may depend on the operand size of the instruction. In one embodiment, largest operand size may be 1/Nth of the data from an entry (e.g. each PE 42 may operate on one operand at the largest operand size). The operand sizes vary by a power of 2, so each PE 42 may operate on two operands of the second largest operand size, four operands of the third largest operand size, etc.

The decode unit 34 may decode the instructions to generate the ops for the op queue 38, and may determine the PEs 42 that may be used by a given op. As mentioned previously, vector ops may use one row of the PEs 42. Matrix ops may use all rows and columns of PEs 42. However, both types of instructions may support masking (specified in the instruction as sent to the coprocessor 10. For vector ops, there may be a single mask that determines which vector elements are active in the source vectors. For matrix ops, there may be a horizontal mask and a vertical mask for each operation. The horizontal mask may indicate the PEs 42 in the horizontal direction as shown in FIG. 2 that may evaluate for the given op, and the vertical mask may indicate that PEs 42 in the vertical direction as shown in FIG. 2 that may evaluate for a given op. Thus, the horizontal mask may identify which X vector elements are active, and the vertical mask may indicate which Y vector elements are active. The intersection of the two masks may determine which PEs 42 will evaluate when the op is executed. For example, each mask may include a bit for each PE 42 in the given direction. The bit may be set to indicate that the PE 42 will evaluate and clear to indicate that the PE 42 will not evaluate for the op. Thus, for example, an array of 8 by 8 PEs 42 may include a horizontal mask of 8 bits and a vertical mask of 8 bits. In another embodiment, a given PE element may operate on multiple input vector elements for at least some operand sizes. The masks may be defined per-element for such embodiments. Any combination of masks may be supported in various embodiments.

Based on the masks, the operand size of the op, and the type/mode of the op (vector or matrix), one or more hazard mask values may be generated for each op (HazardMask in each op queue entry in the op queue 38 in FIG. 2). The hazard mask values may be an indication of the portion of the Z memory 28 that is updated by the op, and may be used to ensure that read after write and write after read/write dependencies between ops are respected in the scheduling of ops by the scheduler 36. The PEs 42 may implement a pipeline, at the end of which the Z memory 28 may be updated. Thus, read after write dependencies may clear when a dependent op is ensured to read the Z memory 28 after the preceding op writes the entry. For multiply-accumulate ops, the Z memory 28 may be read at the beginning of the accumulate operation and may be written at the end of the accumulate operation. Thus, the dependency may be cleared once the dependent op is ensured to not reach the beginning of the accumulate pipeline before the preceding op reaches the end of the accumulate pipeline. Write after read/write dependencies may clear on issue of the preceding operation, since the preceding operation will reach read stage and the write stage before the dependent operation reaches the write stage.

In addition to the hazard mask values and the op itself, each entry may store a destination ID identifying the Z memory entry updated by the instruction. In some embodiments, the destination ID is used only for vector ops, to determine which row of Z is updated. In other embodiments, the destination ID is used for both vector and matrix ops. Various embodiments are described in more detail below.

The op queue 38 stores the ops until the ops may be executed by the execute circuit 30 (as determined by the scheduler circuit 36). Two exemplary op queue entries are shown in FIG. 2, although any number of entries may be supported in other embodiments. Each entry may include the op, a destination ID corresponding to the Z memory 28, and source IDs corresponding to the X and Y memories 24 and 26, respectively. The source IDs may be rename register IDs, and the mapping of rename registers to architected X and Y memory entries may be maintained by the rename hardware in the decode unit 34. Generally, new renames are assigned when the X memory 24 or Y memory 26 are the destination of a write (e.g. a load instruction, an extract from Z instruction, or, in some embodiments, various other move instructions). Additionally, the HazardMask data is shown for each op. Various other information may be stored in each op queue entry for other purposes, as desired in various embodiments, illustrated as the State field in each entry. In an embodiment, the HazardMask data in the op queue entries and the corresponding data for a newly decoded op may be used to generate a dependency vector or vectors for the newly decoded op as it is written to the op queue 38. The dependency vector may include a bit for each op queue entry, indicating whether or not the op is dependent on the op in that op queue entry due to Z memory hazards. The ops may wait for their source operands to be ready and for the dependency vectors to clear, for example, and may be selected by the scheduler circuit 36 for issue to the execute circuit 30 thereafter. Other conditions may control issue as well, e.g. older ops may be favored for issue over younger ops, etc. The scheduler circuit 36 may be responsible for determining which ops are available to issue and scheduling the ops for issue.

An issued op may read their source operands from the data buffer 40 and progress to the PEs 42 in the execute circuit 30 for execution. The PEs 42 may perform the specified operation, generating results and writing the results to the local Z memory locations implemented at the PEs 42.

The memory access interface 32 may include a memory op queue 46 and a memory scheduler circuit 44. Similar to the scheduler circuit 36, the memory scheduler circuit 44 may wait for the source operands of the memory ops to be ready and issue the memory ops. The memory scheduler circuit 44 may ensure that memory ops to the same address are issued in program order (e.g. using dependency vectors or other mechanisms based on comparing the addresses accessed by the memory ops). The source operands may be store data for store memory ops. Load memory ops may not have specific source operands, since the memory addresses are provided by the CPU processor 12 in this embodiment. However, load memory ops may still be scheduled based on address dependencies, if any. The store ops may read their source operands from the data buffer 40, which may transit the data to the L2 cache 14 along with the memory op/address from the memory access interface 32. For load ops, the L2 cache 14 may provide data to the data buffer 40 (and the address at which the data is to be written, which may be transmitted to the L2 cache 14 by the memory access interface 32 when transmitting the load ops). The writing of the load op data to the data buffer 40 may also be communicated to the op queue 38/decode unit 34, to indicate that source data in those memory locations is now available.

An example of an eight by eight grid of PEs 42 is used in the following embodiments. As a further example, the X and Y vector of operands may be 64 bytes of data. That is, an entry in the X and Y memories 24 and 26 that may be used as an operand may be 64 bytes. The X and Y memories 24 and 26 may implement any number of entries, in various embodiments. Other embodiments may use larger or smaller entries. The example may further include a maximum result size (for a given PE 42) of 8 bytes (64 bits). Thus, the maximum total result from the PE array may be 512 bytes. In another embodiment, the maximum result size for a given PE 42 may be 16 bytes (128 bits), and the maximum total result may be 1024 bytes. In one implementation, some instructions may be executed over multiple passes through the PE array and may generate up to 64 bytes of result from each PE 42 over the multiple passes. The Z memory 28 may be a multiple of 512 bytes, to allow for multiple results to be stored therein. In one example, the Z memory 28 may have 4096 bytes (4 kilobytes). Thus, a given PE 42 may be able to update eight 64 bit (8 byte) locations in the Z memory 28. The portion of the Z memory 28 implemented at each PE 42 may thus be eight 64 byte entries. The entries may be addressed differently, depending on the operand size of a given instruction, as will be explained in more detail below. It is noted that other embodiments may vary the sizes and configurations of the grid of PEs 42, the operand sizes, the amount of X, Y, and Z memory, etc.

Figure 3:
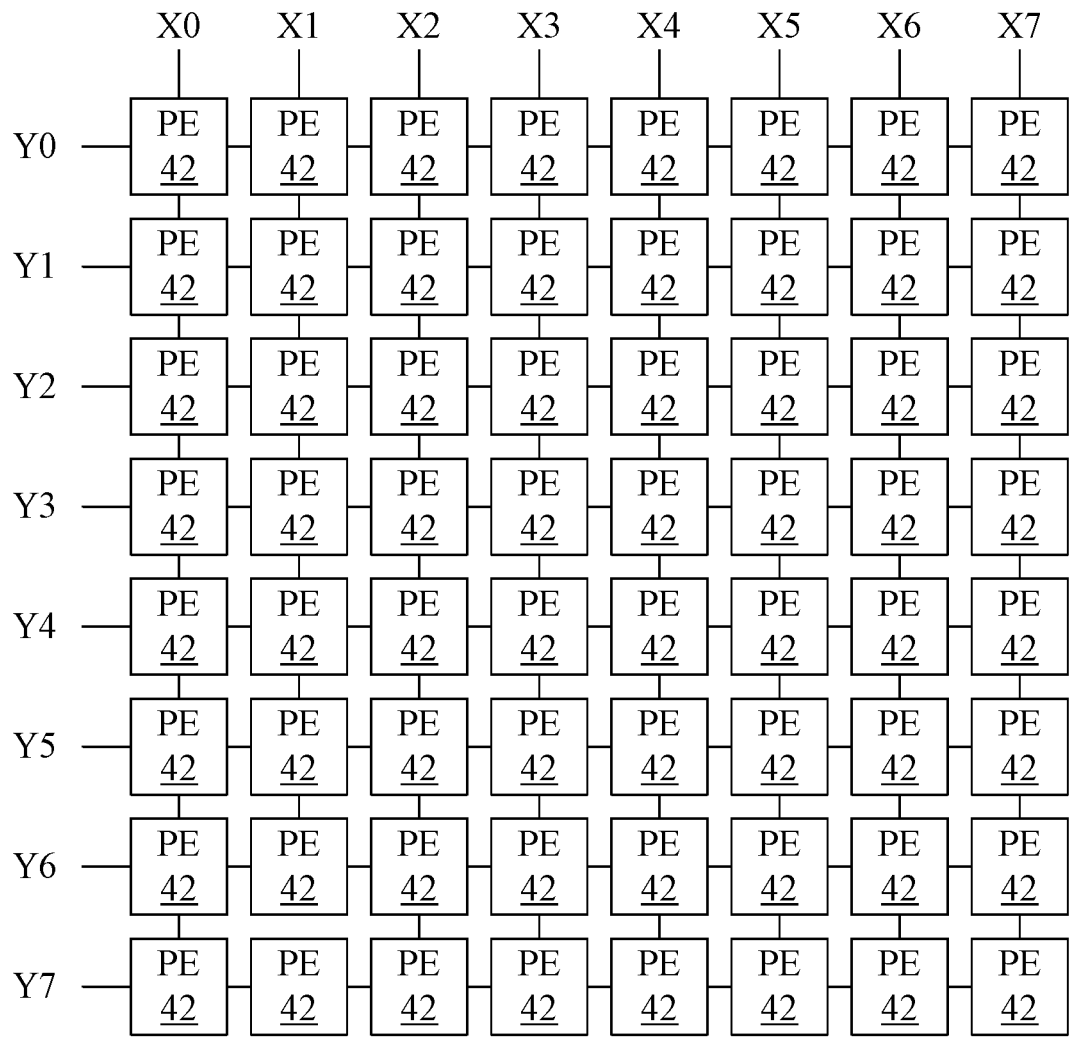
FIG. 3 is a block diagram illustrating one embodiment of distribution of data to processing elements for a matrix mode instruction.

FIG. 3 is a block diagram illustrating the grid of 8 by 8 PEs 42, and the distribution of data for a matrix mode instruction. In FIG. 3, the X operand is illustrated across the top of the grid, and is denoted as operand elements X0 to X7. Each of X0 to X7 may be 8 bytes of the 64 byte X operand in this embodiment. That is, based on its position within the grid, a given PE 42 may receive one of the X0 through X7 elements from the X operand. More particularly, a given column of PEs 42 as shown in FIG. 3 may receive the same X element. Similarly, the Y operand is illustrated along the left edge of the grid in FIG. 3, and is denoted Y0 to Y8, where each of Y0 to Y7 may be 8 bytes of the 64 byte Y operand. The 8 byte operand element may be a single 8 byte vector element, two 4 byte vector elements, or four 2 byte vector elements, for example, depending on the operand size of the instruction.

Figure 4:
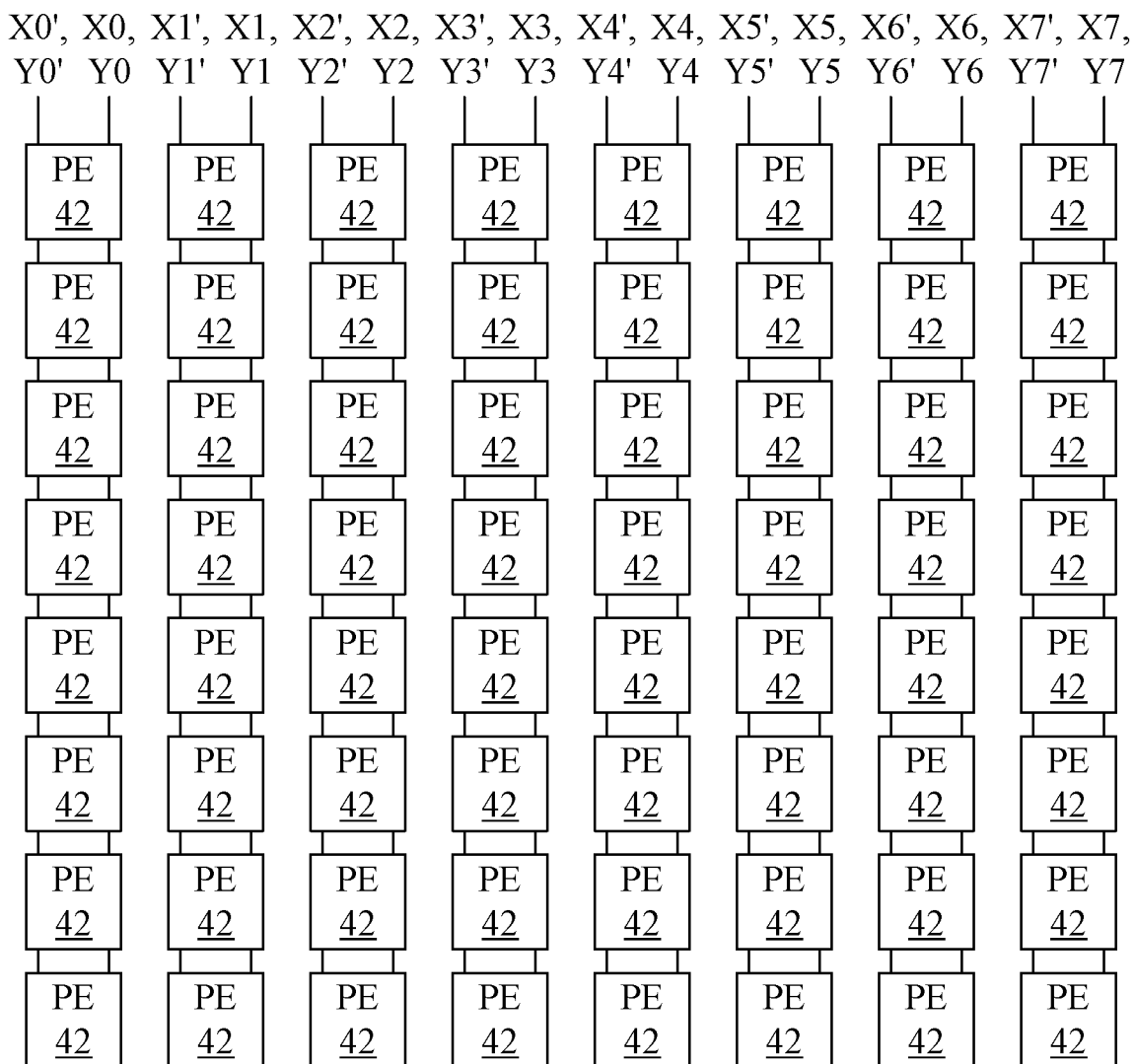
FIG. 4 is a block diagram illustrating one embodiment of distribution of data to processing elements for a vector mode instruction or instructions.

FIG. 4 is a block illustrating the grid of 8 by 8 PEs 42, and the distribution of data for a vector mode instruction. More particularly, in one embodiment, the coprocessor 10 supports the issue of two vector instructions concurrently when the two vector instructions use different rows of the grid (e.g. the target Z memory locations are in different rows of the grid). Accordingly, two sets of X and Y operands may be routed to the PEs 42. More particularly, each column of PEs 42 may receive an X and Y operand element for each operation (e.g. X0 and Y0 for one vector operation and X0' and Y0' for another vector operation to the left-most column of PEs in FIG. 4).

Figure 5:
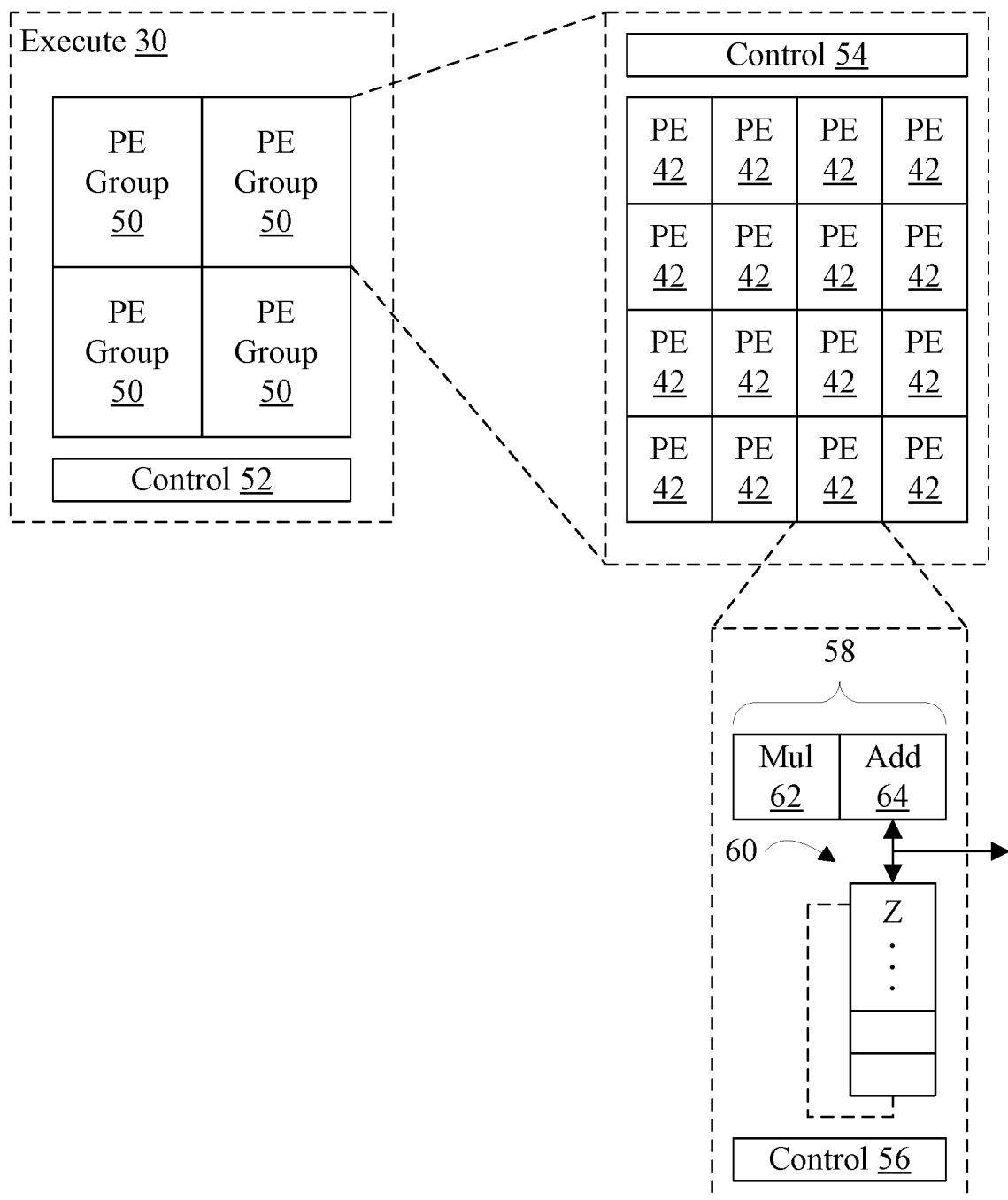
FIG. 5 is a block diagram of one embodiment of a execute circuit shown in FIGS. 1 and 2 in greater detail.
Figure 6:
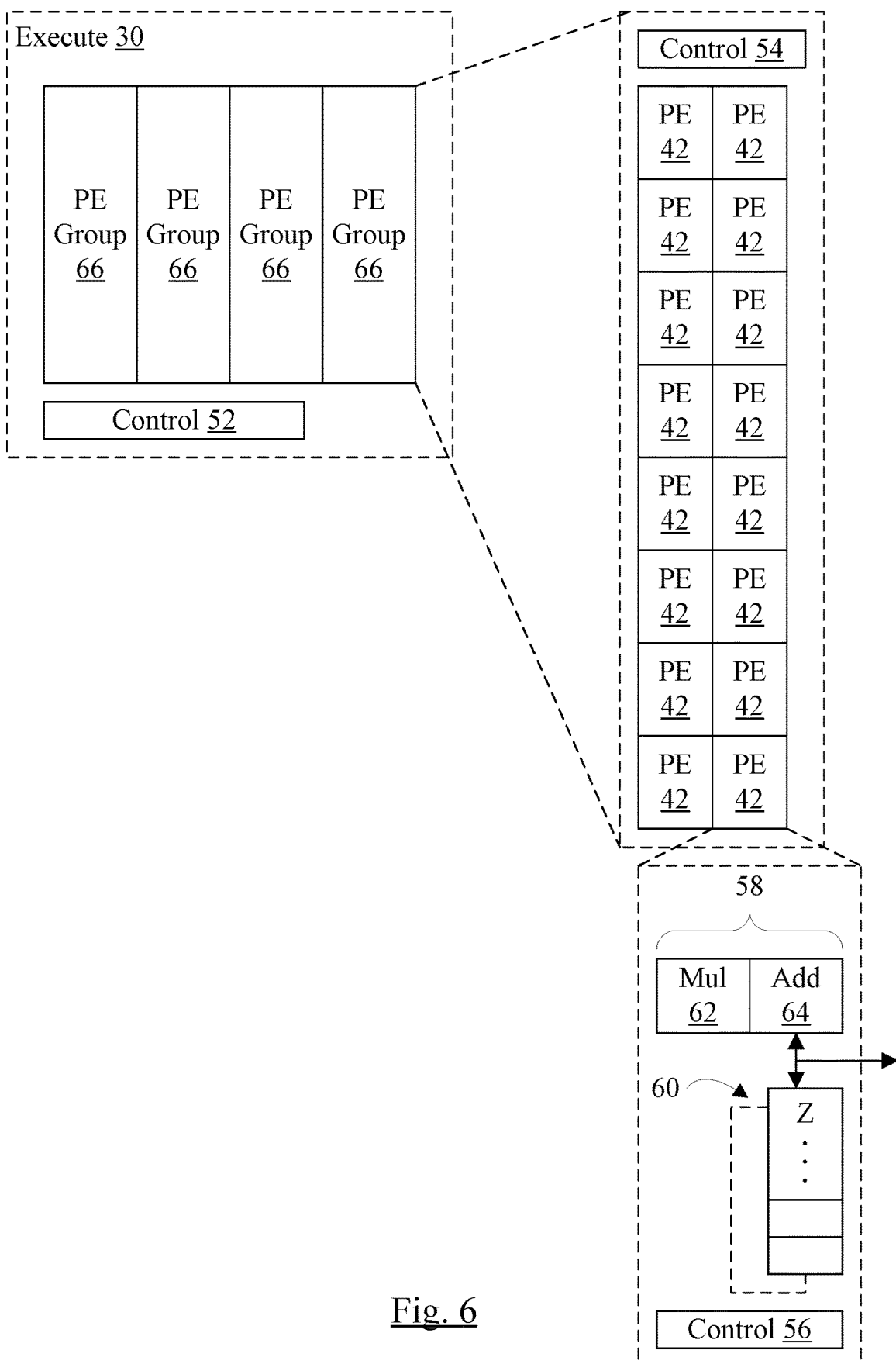
FIG. 6 is a block diagram of another embodiment of a execute circuit shown in FIGS. 1 and 2 in greater detail.
Figure 7:
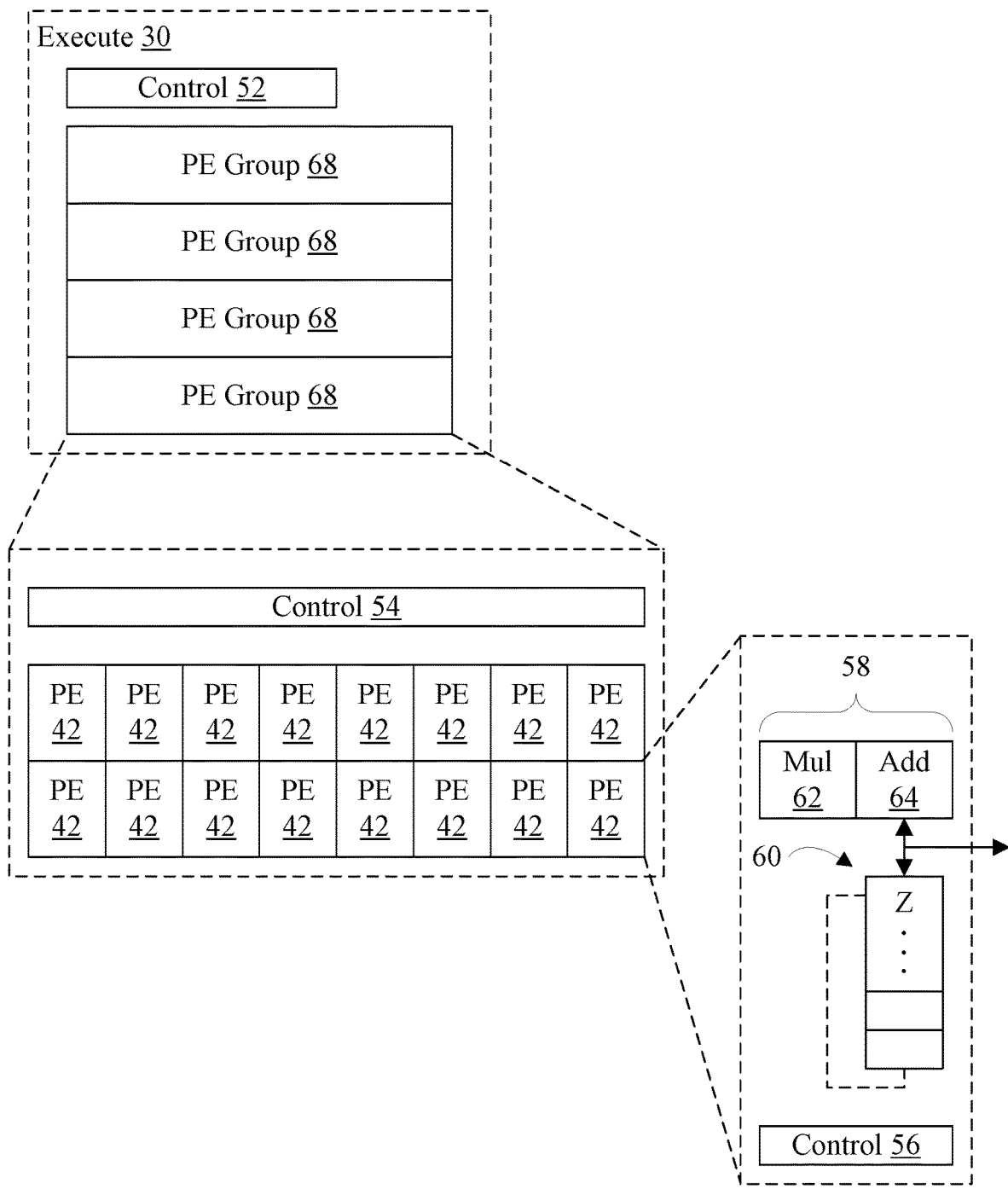
FIG. 7 is a block diagram of still another embodiment of a execute circuit shown in FIGS. 1 and 2 in greater detail.

FIGS. 5 to 7 illustrate various embodiments of the execute circuit 30. In the illustrated embodiments, the PE array may be divided into PE groups having various configurations, as discussed in more detail below. Other embodiments may be implemented as well; the illustrated embodiments are not meant to be exhaustive. For example, the number of PEs 42 in a given PE group, the arrangement of the PEs 42 within a PE group, and the number of PE groups in the execute circuit 30 may vary.

FIG. 5 is a block diagram of one embodiment of the execute circuit 30 in greater detail. In the illustrated embodiment, the execute circuit 30 includes a set of PE groups 50 and a first control circuit 52 coupled to the PE groups 50.

One of the PE groups 50 is shown in exploded view in FIG. 5, and the other PE groups 50 may be similar. More particularly, each PE group 50 may be configured as shown in the exploded PE group 50. In the exploded view, the PE group 50 includes an array of PEs 42. The array of PEs 42 may implement a portion of the overall array of PEs 42 that form the execute circuit 30. In the illustrated embodiment, each PE group 50 includes a four by four array of PEs 42, and thus the overall array of PEs 42 is eight by eight, for a total of 64 PEs in eight rows by eight columns, in this embodiment. Each PE group 50 may include a second control circuit 54 coupled to the PEs 42 in that PE group 50.

One of the PEs 42 is shown in exploded view in FIG. 5, and other PEs 42 may be similar. More particularly, each of the PEs 42 may be configured as shown in the exploded PE 42. In the exploded view, the PE 42 includes an ALU circuit 58, local Z memory 60, and a third control circuit 56. The ALU circuit 58 may generally include the circuitry that performs the ALU operations that may be specified by instructions defined for the coprocessor 10. In an embodiment, the coprocessor 10 supports fused multiply-add (or multiply-accumulate) operations, and thus the ALU circuit 58 includes a multiplier 62 and an adder 64. X and Y operands may be provided to the multiplier 62, which may multiply the operands. The adder 64 may receive the multiplication result and a Z operand which may be the contents of one of the entries of the local Z memory 60. The adder 64 may add the multiplication result and the Z operand to produce a result. The result may be written back to the Z memory 60 entry from which the Z operand was read. Thus, over multiple instructions, the results of multiple multiplications may be accumulated in an entry of the Z memory 60. Some embodiments may support performing only multiplication, or only addition, using additional instructions. Still further, other embodiments may support other ALU operations such as logic operations (AND, OR, NOT, etc.), shift operations, rotate operations, etc. Such embodiments may employ additional ALU circuitry 58 for such instructions.

The control circuits 52, 54, and 56 may each implement various control operations to effect the overall execution of instructions in the execute circuit 30. For example, the control circuit 52 may be responsible for clocking controls, and muxing/data routing of X and Y operands to the PE groups 50. For example, a matrix instruction may provide the same X operand element to each PE 42 in a given column, and the same Y operand element to each PE 42 in a given row, as illustrated in FIG. 3. On the other hand, a vector instruction provides a different Y operand element and a different X operand element to each PE 42 in a given row that is performing the vector operation (e.g. supplying the same X and Y operand elements to each column a shown in FIG. 4). The control circuit 52 may provide the control to route the correct operand elements for each instruction. In an embodiment, X and Y operand elements may be read starting at any byte offset within a given X or Y entry (and the remaining operands may be read from the given entry and the next entry with various offsets). The control circuit 52 may be responsible for aligning the first operand to the first row or column of PEs 42 and aligning the remaining operands. Alternatively, the alignment may be managed by circuitry in the data buffer 40 or between the data buffer 40 and the execute circuit 30.

The control circuit 54 may be responsible for controlling which PEs 42 in the PE group 50 are active. For example, as mentioned previously, some embodiments may support masking of the input vector elements for a given instruction, as part of the instruction itself as issued to the coprocessor 10. In such embodiments, the masks may be processed by the control circuit 54 to cause various PEs 42 to be active (performing the specified operations for the instruction and updating the targeted Z entry or entries in the local Z memory 60 for the input vector elements that are not masked) or inactive (performing no operations, and not updating the local Z memory 60 for the input vector elements that are masked).

The control circuit 56 may be responsible for controlling the pipeline for the ALU circuit 58 and the reading and writing of the local Z memory 60. The local Z memory 60 includes the Z memory locations that the given PE 42 is capable of updating. That is, over any instruction encodings that may be provided to the coprocessor 10, the Z memory 60 includes the locations that would be updated by the given PE 42. Furthermore, no other PE 42 may be able to update the locations in the local Z memory 60.

In FIG. 5, additional Z memory 60 is shown in dotted form. In an embodiment, the coprocessor 10 may support multiple contexts. The local Z memory 60 may have locations for each context. Thus, for example, there may be two contexts as shown in FIG. 5. However, other embodiments may support more than two contexts. A given instruction issued to the coprocessor 10 may include a context ID to select between the contexts for the given instruction. Hazarding may take into account the context as well (e.g., no hazard may be detected between instructions in different contexts). In an embodiment, there may be one context for each processor that may share the coprocessor 10.

In addition to supplying data to the adder 64 and receiving data from the adder 64, the PE 42 may also provide data out (e.g. arrow to the right in FIG. 5). The data output may be provided back to the data buffer 40 to write results for extract instructions (which move data from Z memory 28 to the X memory 24 or the Y memory 26). The data output may also be used for store Z instructions, which write data from the Z memory 28 to the main memory. In an embodiment, the decode unit 34 may decode load Z and store Z instructions into two ops: a load/store op that moves data between memory and a temporary register, and a move op that moves data between the temporary register and the Z memory. The output from the local Z memory 60 to the data buffer 40 may support the movement of data from the Z memory to the temporary register. Additional details are provided below with respect to FIG. 10.

FIG. 6 is a block diagram illustrating another embodiment of the execute circuit 30. In this embodiment, the PE array may be formed from columns of PE groups 66, along with the control circuit 52. One of the PE groups 66 is illustrated in exploded view in FIG. 6, and the other PE groups 66 may be similar. More particularly, each PE group 66 may be configured as shown in the exploded PE group 66. Two columns of PEs 42 are shown in FIG. 6 for a PE group 66, and thus four PE groups 66 provide an eight by eight grid of PEs 42. The control circuit 54 is included as well for each PE group 66.

One of the PEs 42 is shown in exploded view in FIG. 6, and other PEs 42 may be similar. More particularly, each of the PEs 42 may be configured as shown in the exploded PE 42. The PE 42 may be the same as the PE 42 shown in FIG. 5, and the discussion above with regard to FIG. 5 and the PE 42 applies to FIG. 6 as well.

FIG. 7 is a block diagram of still another embodiment of the execute circuit 30. In this embodiment, the PE array may be formed from rows of PE groups 68, along with the control circuit 52. One of the PE groups 68 is illustrated in exploded view in FIG. 7, and the other PE groups 68 may be similar. More particularly, each PE group 68 may be configured as shown in the exploded PE group 68. Two rows of PEs 42 are shown in FIG. 7 for a PE group 68, and thus four PE groups 68 provide an eight by eight grid of PEs 42. The control circuit 54 is included as well in each PE group 68.

One of the PEs 42 is shown in exploded view in FIG. 7, and other PEs 42 may be similar. More particularly, each of the PEs 42 may be configured as shown in the exploded PE 42. The PE 42 may be the same as the PE 42 shown in FIG. 5, and the discussion above with regard to FIG. 5 and the PE 42 applies to FIG. 7 as well.

The PE groups 50, 66, or 68 may be somewhat independent, since the Z memory is local to each PE 42 and the control circuits are distributed to the PE groups and PEs as well. Accordingly the PE groups 50, 66, or 68 may be physically placed on an integrated circuit with some flexibility, which may ease the implementation of the coprocessor 10 overall. For example, space may be created between the PE groups 50, 66, or 68 to ease wiring congestion to the PE groups. The PE groups 50, 66, or 68 may be rotated or otherwise oriented to fit in the available space, etc.

Based on FIGS. 3 and 4, the PE groups 50, 66, and 68 may have different wiring requirements. For example, a given PE group 50 may receive 32 bytes of X operand elements and 32 bytes of Y operand elements for matrix mode, and may receive 2 sets of 32 bytes of X operand elements and 2 sets of 32 bytes of Y operand elements for vector mode. Thus, the worst case wiring requirements are 512 wires for X operand elements (vector mode, 2×32×8) and 512 wires for Y operand elements (vector mode 2×32×8) for the PE group 50. A given PE group 66 may receive 16 bytes of X operand elements and 64 bytes of Y operand elements for matrix mode, and may receive 2 sets of 16 bytes of X operand elements and 2 sets of 16 bytes of Y operand elements for vector mode. Accordingly, the worst case wiring requirements for a PEG group 66 are 256 wires for X operand elements (vector mode, 2×16×8) and 512 wires for Y operand elements (matrix mode, 64×8). A given PE group 68 may receive 64 bytes of X operand elements and 16 bytes of Y operand elements for matrix mode, and may receive 2 sets of 64 bytes of X operand elements and 2 sets of 64 bytes of Y operand elements for vector mode. Accordingly, the worst case wiring requirements for a PEG group 68 are 1024 wires for X operand elements (vector mode, 2×64×8) and 1024 wires for Y operand elements (matrix mode, 2×64×8).

In addition to variations based on wiring requirements, embodiments that support a reduced size grid (e.g. as described below with regard to FIGS. 15-17) may have tradeoffs in the number of passes needed to complete a vector or matrix mode instruction. Thus, different embodiments may choose to use different forms for the PE groups, trading off the various advantages and costs as desired for a given implementation.

FIG. 8 is a block diagram of one embodiment of Z memory hazarding for the coprocessor 10. In the illustrated embodiment, the Z memory 28 is addressed as 64 rows of data, and thus a given coprocessor instruction may include a 6 bit destination identifier (DestID in FIG. 2). For a 4 kilobyte Z memory 28, each row may include 64 bytes of data. Since there are 8 rows of 8 PEs 42, each PE 42 may include eight rows of the Z memory 28, and may include 8 bytes of that row, offset from the beginning of the row by the column number is which the PE 42 is included.

Depending on the operand size, a given matrix instruction may read and/or update a variable number of rows of Z memory 28, because the number of operations increases as the operand size decreases. That is, a given entry of the X memory 24 and the Y memory 26 may include sufficient storage to provide an operand of the largest size supported by the coprocessor 10 to each PE 42 in a column or row (e.g. 8 operands, in one embodiment). Thus, 64 results may be produced when executing an instruction having the largest operand size. The second largest operand size is one half the size of the largest operand size (since operand sizes are related by powers of two). Accordingly, twice as many operands are provided in the same space in the X and Y memories. Since each operand in X is multiplied by each operand in Y, four times as many operations may be performed, producing four times as many results. Adjusting for the smaller size of the results, twice as much space is consumed to write the results (and to supply values for accumulation as well). Similarly, the third largest operand size is one quarter the size of the largest operand size and produces 16 times as many results, occupying four times the space, etc. Vector operations read/write one row of the Z memory 28. Load/store instructions affect one row, or 2 adjacent rows for the LoadZI/StoreZI instructions. The instruction set may also support extract instructions, which move data from the Z memory 28 to the X memory 24 or the Y memory 26. In one embodiment, the extract to X instruction permits one row of Z to be moved to one row of X, and thus one row is affected. The extract to Y instruction may have an operand size and may extract multiple rows, similar to the ALU operations that of similar size. In an embodiment, the multiply-accumulate operations may be floating point values of 64, 32, or 16 bits (FP 64, FP 32, or FP 16) or integer values of 16 bits (MAC 16).

The instruction set may specify that the entries of the Z memory 28 that are read for accumulation operands and written by the results of various sizes are separated in a regular pattern in the Z memory 28, as shown in table 70, middle column. That is, 64 bit operand sizes update every eighth row, 32 bit operand sizes update every fourth row, 16 bit operand sizes update every second row. In an embodiment, the instruction set also supports 16 bit operand size with 32 bit accumulation which updates every row of Z memory 28. The rows to be updated are based on the DestID. That is, the row updated by the first result is specified by the DestID, the next row to be updated is the DestID+number of rows between updates, etc. Accordingly, depending on the number of rows updated, only a portion of the destination ID need be considered for hazarding. If every eighth row is updated, the three least significant bits of the DestID identifies the rows read/updated by the instruction. If every fourth row is update, the two least significant bits of the DestID identifies the rows read/updated, etc. Accordingly, as shown in the HazardMask column in the first four rows of the table, a mask having zeros in the most significant bits and ones in the least significant bits (or all zeros if every row is read/updated) may be generated. When a single row is read/updated, the entire DestID is used for hazarding (HazardMask of all ones), and when two adjacent rows are updated, the least significant bit of the DestID is not used for hazarding (last three rows of table 70).

The decode unit 34 may generate HazardMask for each instruction when decoding the instruction, and may write the HazardMask to the op queue 38 with the instruction. Additionally, the HazardMask of the instruction being written and the HazardMasks of the instructions already in the op queue 38 may be used to compare the DestID of the instruction being written and the DestIDs of the instructions in the op queue 38 to detect hazards. More particularly, the HazardMask of the instruction being written may be logically ANDed with the HazardMask of a given instruction in the queue, and the corresponding mask may be used to mask the DestID of the instruction been written and the DestID of the given instruction. The masked DestIDs may be compared for equality to detect a hazard, which is a dependency of the instruction being written on the given instruction (equation 72). Equation 72 may be evaluated for each instruction in the queue and the instruction being written to produce a Z hazard dependency vector for the instruction being written. The scheduler circuit 36 may prevent the scheduling of the instruction being written until the instructions identified by set bits in the Z hazard dependency vector have been issued and cleared the pipeline far enough to clear the hazard. For write after read/write hazards, the issuance of the preceding instruction is sufficient to clear the hazard. For read after write hazards, the preceding instruction needs to have progressed at least the number of cycles that exist in the pipeline between the Z memory read for accumulation (e.g. the first stage of the add pipeline, in one embodiment) and the stage at which the Z memory is written (e.g. the last stage of the add pipeline, in one embodiment).

Figure 9:
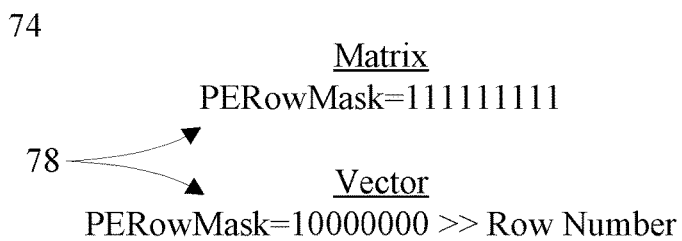
FIG. 9 is a block diagram illustrating Z memory hazarding for another embodiment of the execute circuits shown in FIGS. 5 to 7.

FIG. 9 is a block diagram of another embodiment of Z memory hazarding for the coprocessor 10. In the illustrated embodiment, the Z memory 28 is addressed as a number of rows and a number of banks per row that depends on the Z operand size. The Z operand size may be the same as the X/Y operand size, except for the instructions which use 16 bit X/Y operands but 32 bit accumulation, in which case the Z operand size may be 32 bit. In FIG. 9, the table 74 illustrates various element sizes. In this embodiment, an 8 bit element size is also supported. As the element size decreases, the number of rows of the Z memory 28 increases and the number of banks decreases. Accordingly, a 64 bit element size is addressed as 8 rows with 8 banks/row; a 32 bit element size is addressed as 16 rows of 4 banks/row; a 16 bit element size is addressed at 32 rows of 2 banks/row, and an 8 bit elements size is addressed as 64 rows with one bank per row.

Physically, the Z memory 28 does not change for the various addressing modes. Instead, the banks are mapped to alternating entries of the existing Z memory 28. Thus, for a local Z memory 60, 8 banks map to the 8 entries of the Z memory 60 and a single entry may be written dependent on the bank number specified by the instruction (e.g. the DestID may be the bank number or may include the bank number). For the four bank case, the first four entries are mapped to the four banks, and the last four entries repeat the mapping (e.g. entry 4 is bank 0, entry 5 is bank 1, etc.). The instruction may thus write two local Z memory entries, depending on the bank number. For the two bank case, the banks map to alternating entries and four entries may be written depending on the bank number. For the one bank case, all entries of the local Z memory 60 may be written.

The HazardMask for the embodiment of FIG. 9 may thus include two masks: a ZRowMask which identifies the Z memory 60 entries that are written by the instruction and a PERowMask which identifies which rows of PEs 42 in the execute circuit 30 are active for the instruction.

The ZRowMask may be generated based on the Z operand size, which indicates the number of ones in the mask. The bank number indicates the position of the ones in the mask. Accordingly, as shown in the ZRowMask column of the table 74, the ZRowMask may have a default value, and may be right shifted based on the bank number specified for the instruction (0 to the number of banks-1, in this embodiment). The bank number may be the DestID, in this embodiment. Thus, for example, the ZRowMask for bank 1 may be 01000000 for a 64 bit operand size, 01000100 for a 32 bit operand size, 01010101 for a 16 bit operand size, and 11111111 for an 8 bit operand size. For 8 bit operand size, all entries are read/written and thus there is no shift.

For matrix operations, all rows may be active and thus the PERowMask may be all ones, and for vector operations (one row is updated), the PERowMask may have a single set bit for the row that is active. The PERowMask for each case is shown below the table 74 in FIG. 9 (reference numeral 78). In an embodiment, instructions for the coprocessor 10 may also specify the active rows and columns of PEs via masks. In an embodiment, the PERowMask may be adjusted based on the row mask for instruction to make the hazarding more accurate. Other embodiments need not take the row mask into account, however, as the hazarding will create an accurate result without the row mask (but may delay some instructions longer than necessary).

The equation 76 illustrates hazard detection based on the ZRowMask and the PERowMask for an instruction being written to the op queue 38 and a given instruction already in the op queue 38. If the PERowMasks have at least one common set bit and the ZRowMasks have at least one common set bit, a hazard may be detected. This is represented by logically ANDing the respective masks, and bitwise ORing the results to detect at least one set bit in the result. As with the discussion above with regard to FIG. 8, if the result of equation 76 is a hazard, a bit corresponding to the given instruction may be set in the dependency vector of the instruction being written. Evaluating equation 76 for the instruction being written and each instruction already in the op queue 38 may be used to generate the dependency vector, as previously discussed.

Figure 10:
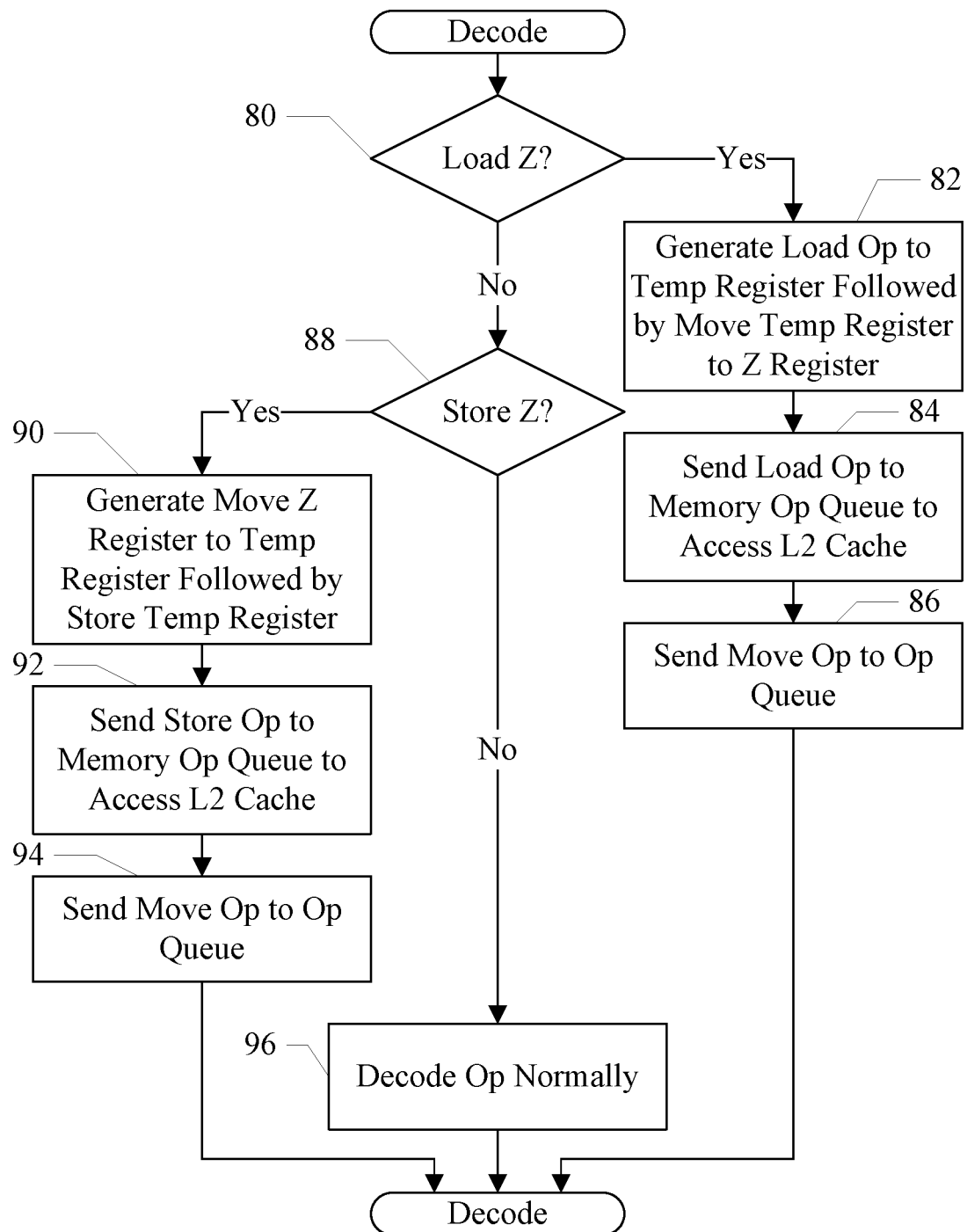
FIG. 10 is a flowchart illustrating operation of one embodiment of the coprocessor for Z memory load/store operations.

Turning now to FIG. 10, a flowchart is shown illustrating the handling of load and store instructions to the Z memory 28, for an embodiment. Since the Z memory 28 is distributed to the PEs 42, as previously described, load/store instructions targeting the Z memory 28 may be issued to the execute circuit 30, unlike load/store instructions targeting the X memory 24 and Y memory 26 (which complete using the data buffer 40). In an embodiment, the decode unit 34 may detect the load/store to Z memory instructions and may decode them into two ops: a load/store op that moves data between a temporary register and the main memory, that is executed by the memory access interface 32, and a move op that moves data between the temporary register and the Z memory 28, that is executed by the PEs 42. The temporary register may be a register that is logically separate from the X memory 24 and Y memory 26, but may be renamed to entries in the data buffer 40 in addition to the X memory 24 and Y memory 26. The temporary registers may not be architected, in the sense that the programmer writing instructions for the coprocessor 10 may not specify the temporary registers. However, the temporary registers may be used by the coprocessor 10 hardware.

More particularly, if the decode unit 34 decodes a load Z instruction (decision block 80, "yes" leg), the decode unit 34 may generate a load op that has the memory address provided with the load Z instruction from the CPU processor 12 and a temporary register assigned by the decode unit 34 as a destination, followed by a move op that moves data from the temporary register to the Z register 28, using a destination ID provided with the load Z instruction (block 82). The temporary register may be renamed to an available entry in the data buffer 40, similar to renaming X and Y memory entries. The decode unit 34 may send the load op to the memory op queue 46 in the memory access interface 32 (block 84), and may send the move op to the op queue 38 (block 86). The load op may be executed similar to other load ops by the memory access interface 34, accessing the L2 cache 14 and permitting the L2 cache 14 to obtain the data if it is not stored therein. The data returned by the L2 cache 14 may be written to the entry in the data buffer 40 assigned as the rename of the temporary register. Responsive to the write, the data buffer entry may be marked valid, which may permit the move op to issue. The move op may read the data from the temporary register, and write the data to the target Z memory locations.

If the decode unit 34 decodes a store Z instruction (decision block 88, "yes" leg), the decode unit 34 may generate a move op that moves data from the Z register 28, using a destination ID provided with the load Z instruction, to a temporary register assigned by the decode unit 34 (block 90) followed by a store op that has the memory address provided with the store Z instruction from the CPU processor 12 and the temporary register as the source. The temporary register may be renamed to an available entry in the data buffer 40, similar to renaming X and Y memory entries. The decode unit 34 may send the store op to the memory op queue 46 in the memory access interface 32 (block 92), and may send the move op to the op queue 38 (block 94). The move op may be executed when any Z hazarding has cleared, and the data may be output from the PEs 42 and written to the data buffer 40. Responsive to the write, the data buffer entry may be marked valid, which may permit the store op to issue (assuming any memory ordering constraints are met). The store op may read the data from the temporary register, and write the data to the target main memory locations, e.g. by transmitting the data to the L2 cache 14 and permitting the L2 cache 14 to complete the write either locally or to the main memory, or both, depending on whether the affected cache line is cached in the L2 cache 14 and based on the design of the L2 cache 14. If the instruction is not a load or store Z instruction, the decode unit 34 may decode the op normally (block 96).

Figure 11:
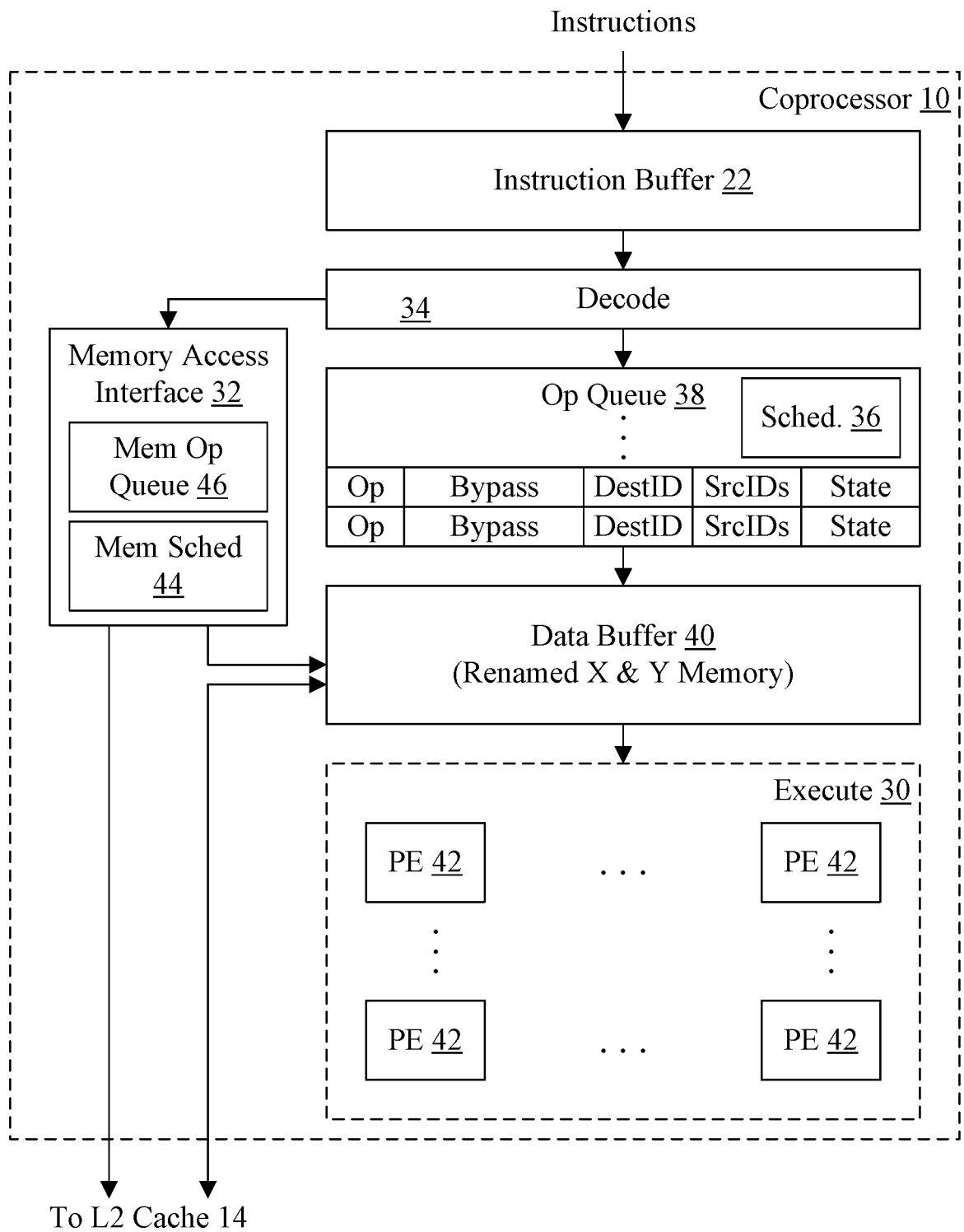
FIG. 11 is a block diagram of another embodiment of the coprocessor in greater detail.

Turning now to FIG. 11, another embodiment of the coprocessor 10 is shown. The embodiment of FIG. 11 may generally be similar to the embodiment of FIG. 2, and the discussion with regard to FIG. 2 may generally apply to FIG. 11. FIG. 11 highlights different data in the op queue entries of the op queue 38, and thus the embodiments of FIG. 2 and FIG. 11 may be combined. More particularly, the op queue entries include a bypass field in FIG. 11. The HazardMask field may be part of the state in each entry. In FIG. 2, the bypass field may be part of the state.

In some cases, one or more pipeline stages may be bypassed for an operation. For example, in the case of a multiply-accumulate operation, some instructions may specify only the multiplication, but not to accumulate the results. Such an operation may be active in the multiply stages of the pipeline but not in the accumulate (add) stages. Other instructions may specify only an accumulate (addition) operation and thus the instructions may not be active in the multiply stages by may be active in the accumulate stages. Still other instructions (e.g. the move ops that are part of the load/store Z instructions, or the extract instructions that move data from Z to X or Y memory) may perform no operations (noops) in the pipeline, but may only read or write a value to the Z register. Such instructions may not be active in any of the execution stages other than to read or write the local Z memory 60. The decode unit 34 may generate bypass values for the ops, indicating which execute stages of the execute pipeline 20 are bypassed by a given op (not active in those stages). For example, each op may have a bypassM and bypassA indication in the bypass field, indicating whether the multiply stages are bypassed (bypassM active) and whether the accumulate (add) stages are bypassed (bypassA active). The bypassM and bypassA indications may be bits, for example, which may be set to indicate bypass (bypass active) and clear to indicate no bypass (bypass inactive, execute stages active). Opposite meanings for the set and clear states may be used, or multi-bit values may be used, in various embodiments. Embodiments which implement different ALUs may include bypass indications that correspond to those ALUs as well.

Figure 12:
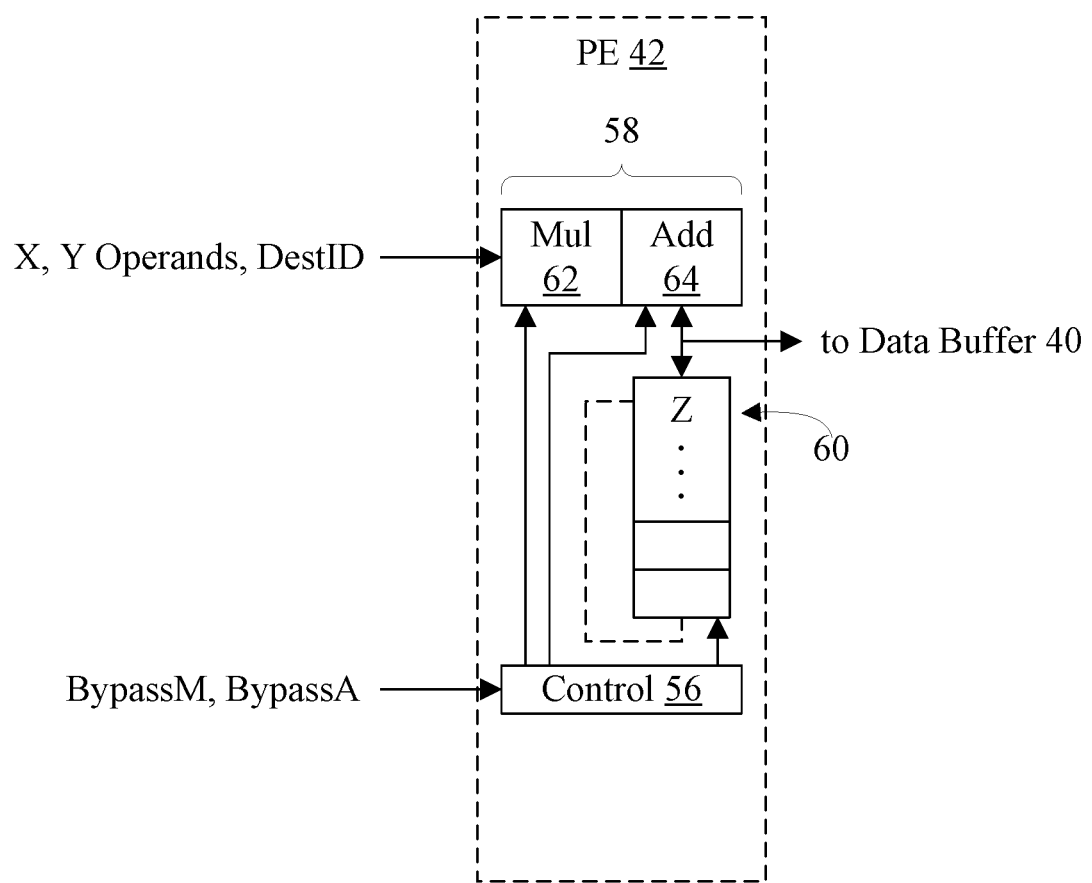
FIG. 12 is a block diagram of one embodiment of a processing element in greater detail.

FIG. 12 is a block diagram of a PE 42 for one embodiment that implements bypass. The PE 42 includes the ALU 58 (e.g. the multiplier 62 and the adder 64, in this embodiment), the local Z memory 60, and the control circuit 56. The multiplier 62 is coupled to receive the X and Y operands that are routed to the PE 42 for the op, as well as the Destination ID (DestID) for the op. The multiplier 62 may pipeline the DestID to the adder 64 to read the Z memory entry affected by the op, and/or to write the Z memory entry, as specified for the op. Alternatively, the DestID may be provided to the control circuit 56 to read/write the Z memory 60.

The control circuit 56 may also be coupled to receive the BypassM and BypassA indications for the op, and may be configured to control the multiplier 62 and adder 64, respectively. The control circuit 56 is coupled to the multiplier 62 and adder 64 as shown in FIG. 12, and is also coupled to the local Z memory 60. More particularly, the control circuit 56 may cause the multiplier 62 to not perform a multiplication on the input operands (e.g. the multiplier circuitry may not evaluate) if the BypassM indication is active, and the operands may be passed through to the adder 64. Similarly, the control circuit 56 may cause the adder circuit 64 not to evaluate if the BypassA indication is active. Other embodiments implementing different ALUs 58 may include bypass indications for each component of the ALU 58 or each pipeline of the ALU 58, as desired.

In addition to providing data to the adder 64 and receiving the result from the adder 64, the Z memory 60 may be coupled to the data buffer 40 to provide data in response to a move op or extract op. The coupling to the data buffer 40 may be through one or more pipeline stages and/or muxing with other PEs 42, e.g. other PEs 42 in the same column as the PE 42, to provide the data to the data buffer 40. In the case that a move op is writing data to the Z memory 60 (e.g. as part of a LoadZ instruction), the data may be provided on one of the X, Y operand inputs (although in this case it has been read from the data buffer 40 from an entry assigned to a temporary register). The BypassM and BypassA indications may both be set to prevent evaluation by the multiplier and the adder, and the data may be provided to the Z memory 60 for storage.

Figure 13:
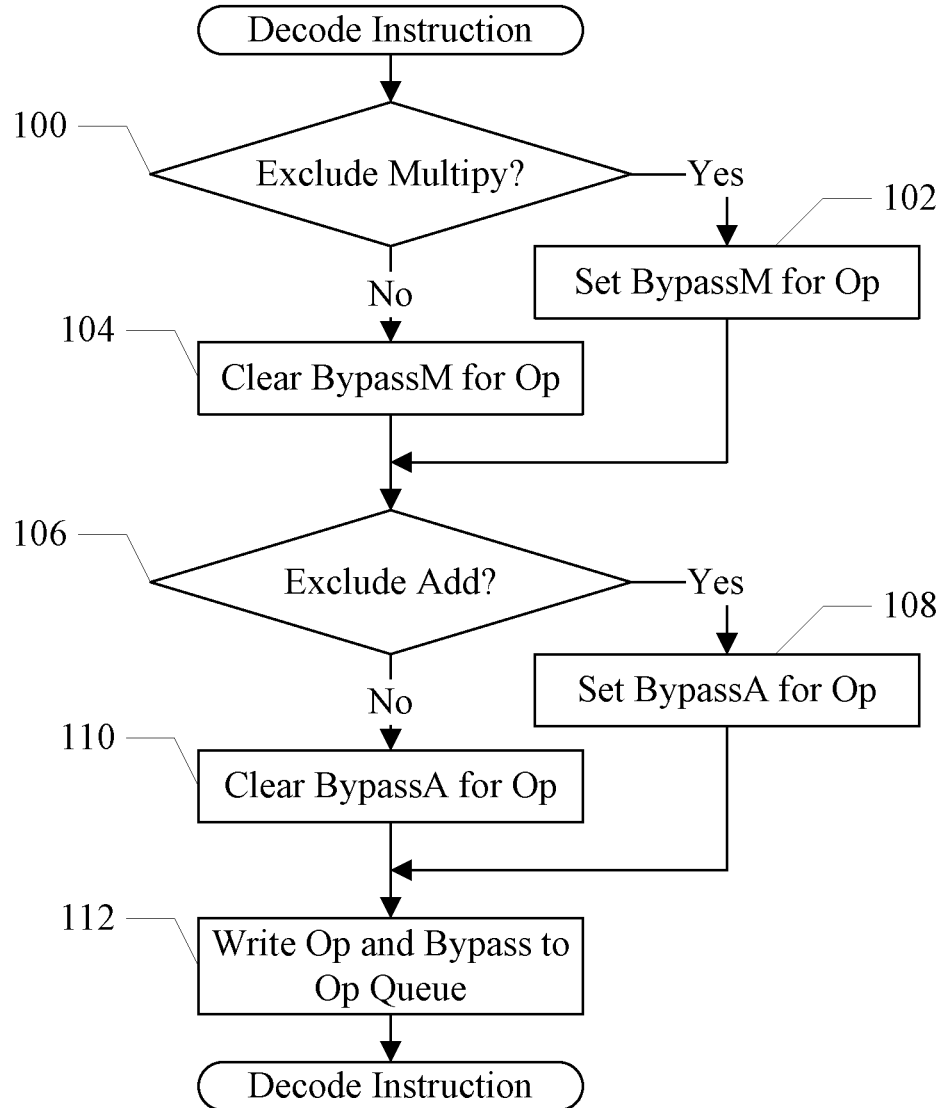
FIG. 13 is a flowchart illustrating one embodiment of decoding an instruction and detecting bypass.

FIG. 13 is a flowchart illustrating operation of one embodiment of the decode unit 34 to decode an instruction. While the blocks are shown in a particular order, other orders may be used. Blocks may be performed in parallel in combinatorial logic in the decode unit 34. Blocks, combinations of blocks, and/or the flowchart as a whole may be pipelined over multiple clock cycles. The decode unit 34 may be configured to implement the operation shown in FIG. 13.

The decode unit 34 may decode the instruction and determine if the operation excludes a multiplication. For example, instructions that specify only an addition may exclude a multiplication. Move and extract instructions may exclude a multiplication. If the instruction excludes a multiplication (decision block 100, "yes" leg), the decode unit 34 may set the BypassM bit for the decoded op (block 102). Otherwise (decision block 100, "no" leg), the instruction includes a multiplication and the decode unit 34 may clear the BypassM bit for the decoded op (block 104). Similarly, the decode unit 34 may decode the instruction and determine if the decoded op excludes an addition. For example, instructions that specify only a multiplication may exclude an addition. Move and extract instructions may exclude an addition. If the instruction excludes an addition (decision block 106, "yes" leg), the decode unit 34 may set the BypassA bit for the decoded op (block 108). Otherwise (decision block 106, "no" leg), the instruction includes an addition and the decode unit 34 may clear the BypassA bit for the decoded op (block 110). The decode unit 34 may write the op and the bypass indication (e.g. BypassM and BypassA bits) to the op queue 38.

Figure 14:
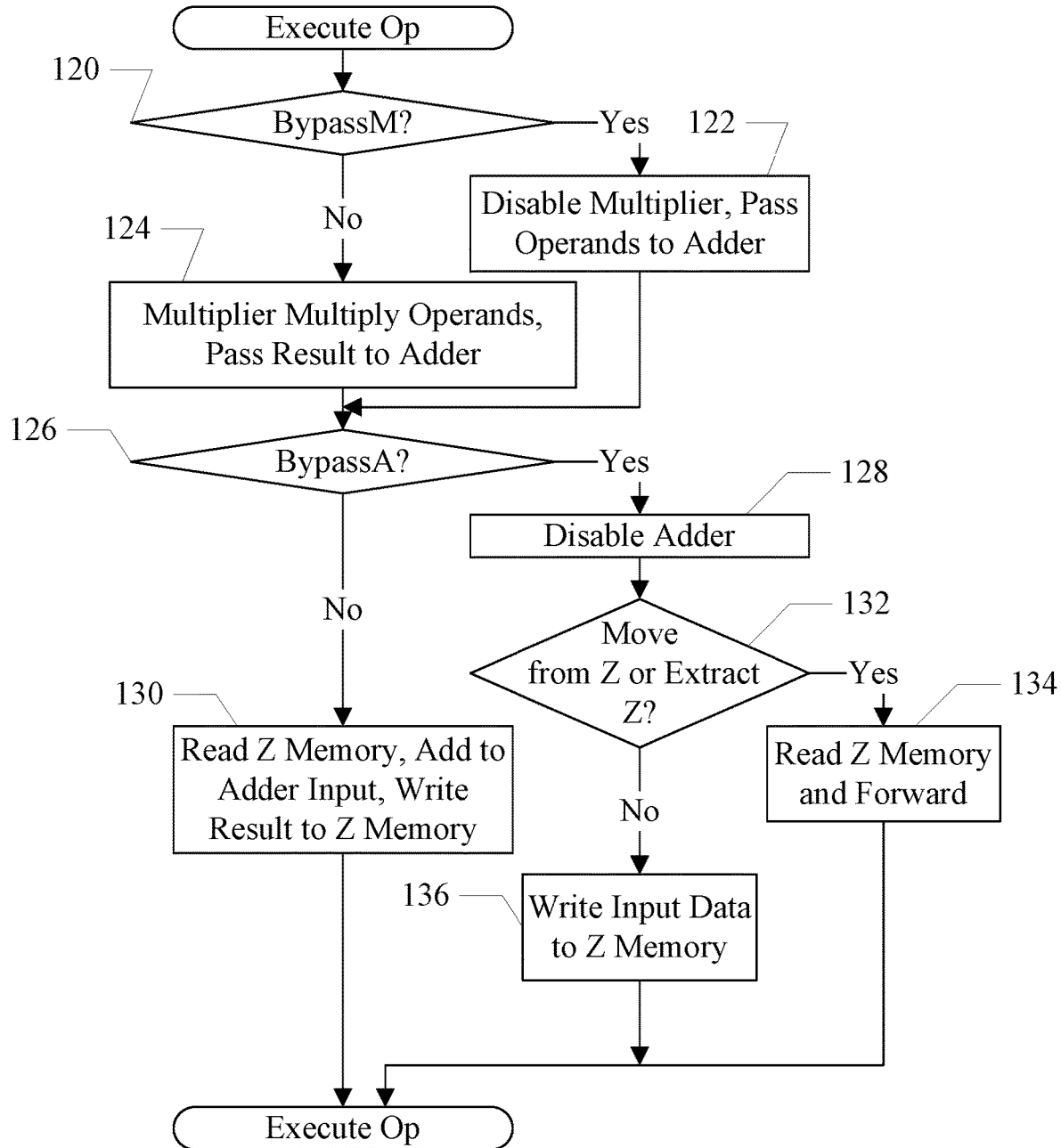
FIG. 14 is a flowchart illustrating one embodiment of executing an operation and implementing bypass.

FIG. 14 is a flowchart illustrating operation of one embodiment of the execute circuit 30 (and more particularly each PE 42) to execute an op issued by the op queue 38. While the blocks are shown in a particular order, other orders may be used. Blocks may be performed in parallel in combinatorial logic in the execute circuit 30/PEs 42. Blocks, combinations of blocks, and/or the flowchart as a whole may be pipelined over multiple clock cycles. The execute circuit 30/PEs 42 may be configured to implement the operation shown in FIG. 14.

If the BypassM bit is set (decision block 120, "yes" leg), the PE 42 may disable the multiplier 62 and pass the received operands to the adder 64 (block 122). Otherwise (decision block 120, "no" leg) the multiplier 62 may multiply the operands and pass the result to the adder 64 (block 124). If the BypassA bit is clear (decision block 126, "no" leg) the PE 42 may read the Z memory specified by the DestID, add the value to the adder input (e.g. the multiplication result, if the BypassM bit is clear, or an input operand or operands, if the BypassM bit is set), and write the result to the Z memory specified by the DestID (block 130).

If the BypassA bit is set (decision block 126, "yes" leg), the PE 42 may disable the adder 64 (block 128). If the op is a move from Z memory or extract Z (decision block 132, "yes" leg), the PE 42 may read the Z memory location specified by the DestID and forward the result to the data buffer 40 (block 134). If the op is not a move from Z or extract Z, it is either a compute op with the BypassA bit set or a move to Z op (decision block 132, "no" leg). In this case, the PE 42 may write the input data to the adder 64 (e.g. the multiplication result or an input operand to the PE 42 for the compute op or move to Z op, respectively) to the local Z memory 60 (block 136).

Figure 15:
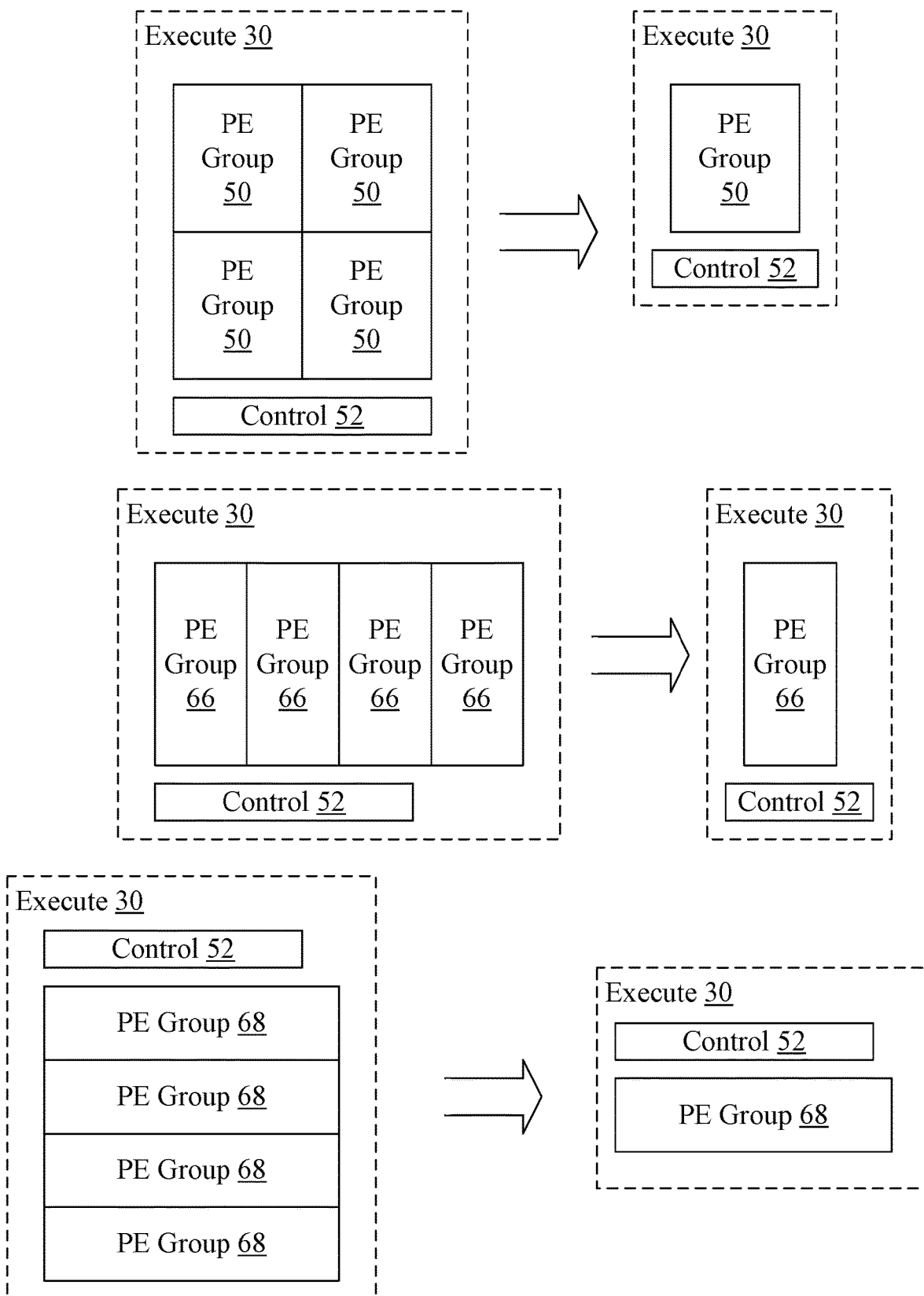
FIG. 15 is a block diagram of various embodiments of a reduced-size execute circuit.

FIG. 15 is a block diagram of the various embodiments of the execute circuit 30 shown in FIGS. 5, 6, and 7, along with corresponding embodiments that implement a single PE group 50, 66, or 68, respectively. Other embodiments may implement more than a single PE group 50, 66, or 68 but fewer than all the PE groups 50, 66, or 68, as desired.

The embodiments implementing a single PE group 50, 66, or 68 may be used when a smaller execute circuit 30 is desired. For example, in an embodiment, a system may include a high performance processor cluster and a power efficient processor cluster. The high performance processor cluster may include CPU processor(s) 12 that are designed for high performance, and which may consume relatively high amounts of power when executed compared to the power efficient cluster. For the high performance cluster, having a high performance coprocessor 10 may be desirable and thus a full execute circuit 30 may be implemented for the high performance processor cluster. However, a reduced size execute circuit 30 may be used in a power efficient processor cluster, to reduce the cost of including the coprocessor 10 with the CPU processor(s) 12 in the power efficient cluster. The power efficient cluster may not require as high performance as the high performance cluster does, since the CPU processor(s) 12 may be executing at lower performance as well in the power efficient cluster.

When a single PE group 50, 66, or 68 is included, coprocessor compute ops may be issued multiple times (multiple passes through the PE group 50, 66, or 68) to complete the full operation. For example, matrix mode instructions may be reissued four times, and the single PE group 50, 66, or 68 may perform a different portion of the overall operation in each issuance. Viewed in another way, the single PE group 50 may serve as each PE group 50 in the full implementation (upper left, upper right, lower left, and lower right, in any order in various embodiments) in different passes of the matrix mode compute op. Thus, in each issuance, a different subset of the operands for the matrix mode instruction that would be operated on by the corresponding PE group (upper left, upper right, lower left, lower right) is supplied to the single PE group 50 during a given issuance. For example, the data buffer 40 may be read, and the corresponding subset of operands may be selected out of the data and supplied to the single PE group 50 (e.g. through a set of multiplexors or the like). Alternatively, the data buffer 40 may be designed to deliver subsets of the overall operands for an instruction operation, based on the configuration of the single PE group 50 and the iteration that is being issued. Similarly, the single group 66 may serve as each PE group 66 of the full implementation (and operand subsets may be selected accordingly, e.g. columns 0 and 1 of the full grid for one iteration, columns 2 and 3 of the full grid for another iteration, etc.). The single PE group 68 may serve as each PE group 68 of the full implementation (and operand subsets may be selected accordingly, e.g. rows 0 and 1 of the full grid for one iteration, rows 2 and 3 of the full grid for another iteration, etc.). Accordingly, a matrix mode op is performed as four passes for any of the embodiments shown in FIG. 15.

A vector mode op uses one row of the PE array. Accordingly, a vector mode op would be issued twice for the single PE group 50, four times for the single PE group 66, or once for the single PE group 68. In an embodiment, the power efficient implementation of the coprocessor 10 may use the PE group 68. However, due to the wiring tradeoffs mentioned previously, other embodiments may choose to implement one of the other PE groups 50 or 66 as the single PE group.

It is noted that, while the PE group 50, 66, 68 in the single PE execute circuit 30 may generally be the same as one PE group 50, 66, or 68 in the full execute circuit 30, the amount of local Z memory 60 may be different. More particularly, the local Z memory 60 may include all the Z memory that the PE 42 in the single PE group 50, 66, or 68 may update (e.g. four times as much Z memory 60 as the PE 42 in the full execute circuit 30). On each pass to complete the matrix mode op, a different portion of the Z memory 60 may be accessed based on the portion of the overall operation being evaluated during that pass.

Figure 16:
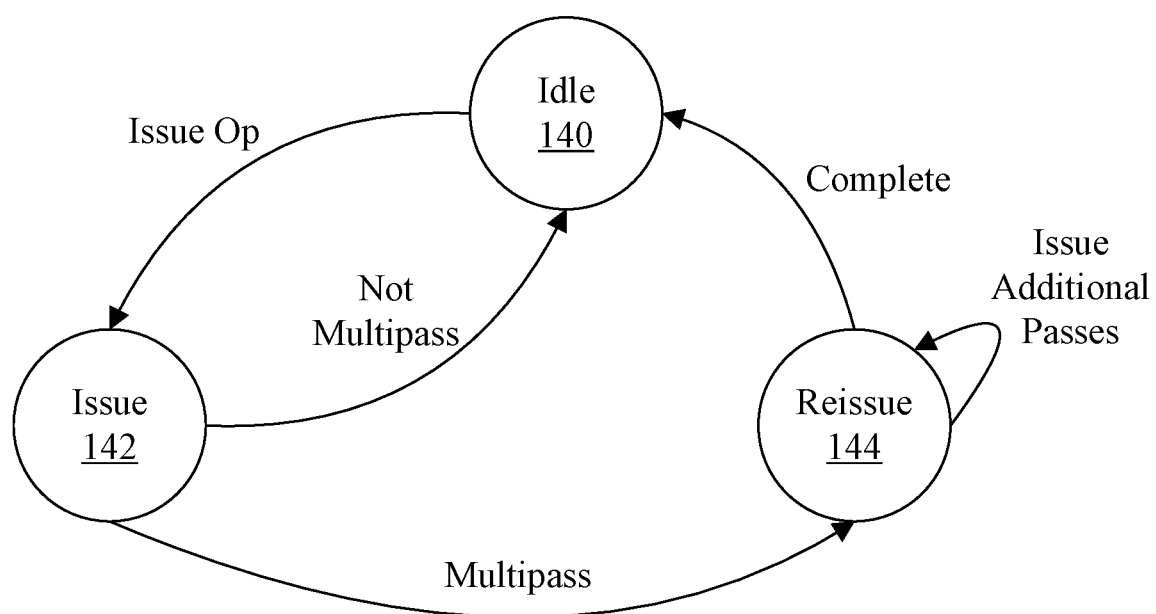
FIG. 16 is a state machine corresponding to an issue control circuit for one embodiment.
Figure 17:
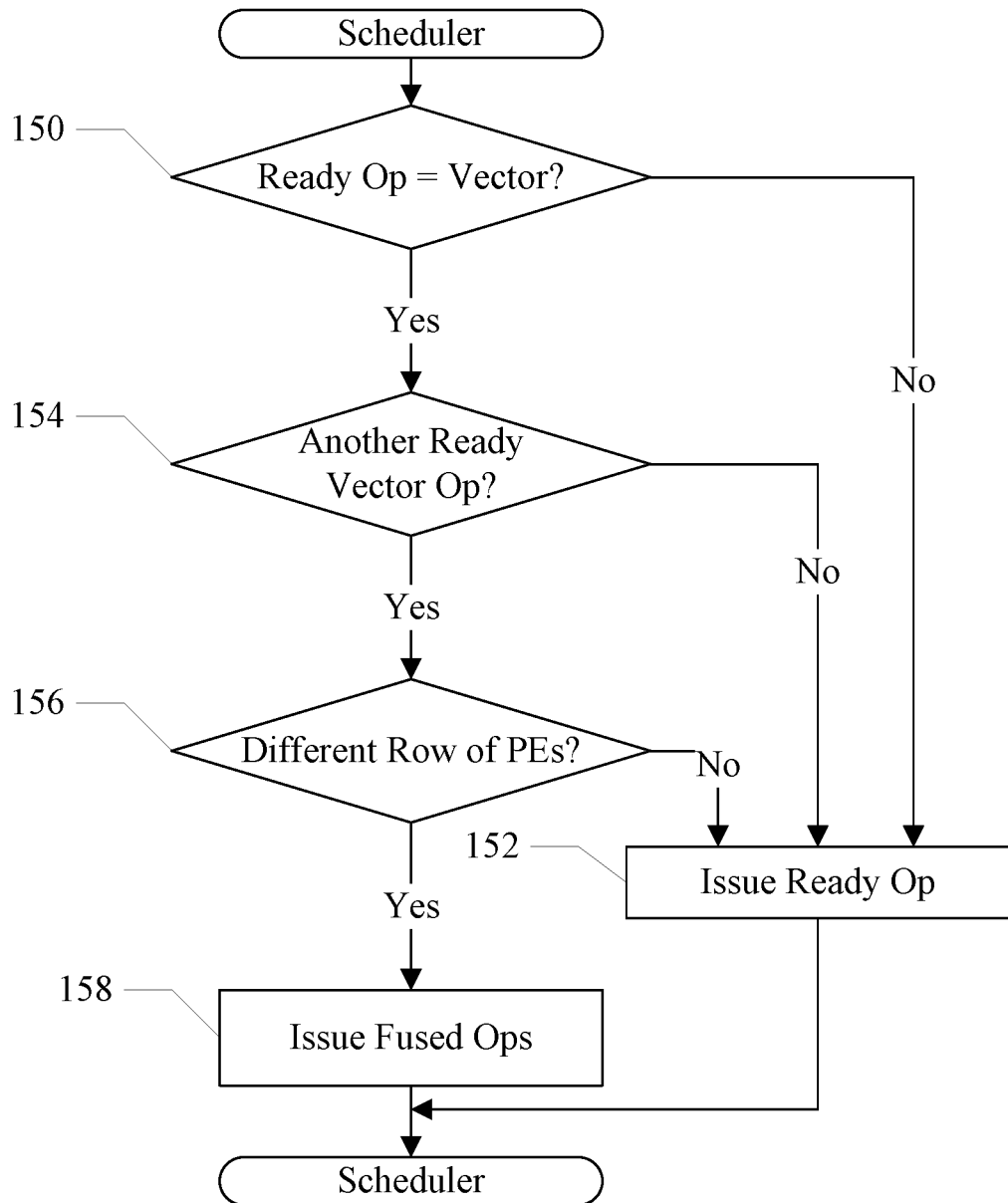
FIG. 17 is a flowchart illustrating one embodiment of op fusion.

The coprocessor 10 hardware may be designed to handle either the single PE group implementation or the full implementation without significant changes. More particularly, the scheduler circuit 36 in the op queue 38 may be designed to reissue the same compute op as needed to complete the op, based on how the execute circuit 30 is configured. An example state machine that may be used in one embodiment of the scheduler circuit 36 is shown in FIG. 16. In the illustrated embodiment, the state machine includes an idle state 140, an issue state 142, and a reissue state 144. The idle state 140 may be the state when an op has not been issued from the op queue 38. The scheduler circuit 36 may monitor the hazard masks and operand readiness of the ops in the op queue 38, and may determine that an op is ready for issue. When the scheduler circuit 36 issues the op, the state machine transitions to the issue state 142.

In the issue state 142, the scheduler circuit 36 may determine if the op is a multipass op or not. A multipass op may be an op that is issued to the execute circuit 30 more than once (e.g., the op makes more than one pass through the execute circuit 30 to complete execution). In one embodiment, there are no multipass ops if the full execute circuit 30 is implemented. If the reduced execute circuit 30 is implemented (e.g. the single PE group implementations, matrix mode ops may be multipass ops. Each pass may operate on one quarter of the overall set of operands for the op. During each pass, a different set of the operands may be provided, corresponding to the quadrant of the overall PE array that is being evaluated on the given pass. In one embodiment, vector mode ops may be single pass in the single PE group implementation (e.g. if the PE group 68 is used). In other embodiments, a vector mode op may be multipass as well (e.g. 2 passes in the PE group 50, 4 passes in the PE group 66).

If the op is not multipass, the state machine may transition from the issue state 142 back to the idle state 140 and additional ops may be issued. If the op is multipass, the state machine may transition to the reissue state 144. The scheduler circuit 36 may reissue the same op for the additional passes while in the reissue state 144. Once the additional passes have been issued, the state machine may transition from the reissue state 144 to the idle state 140.

Generally, the scheduler circuit 36 may issue at most one op per issue cycle. However, as mentioned previously, vector mode ops may use only a single row of PEs 42 during execution. The selected row for a given vector mode op is the row that contains the Z memory 60 that is targeted by the vector mode op (based on the DestID). The other rows are idle during execution of the vector mode op.

In one embodiment, the scheduler circuit 36 may be configured to fuse a second vector mode op with a vector mode op if the second vector mode op uses one of the idle rows. In still other embodiments, multiple vector mode ops may be fused that use different rows of the execute circuit 30. An example that fuses two vector ops is illustrated via the flowchart of FIG. 17. While the blocks are shown in a particular order in FIG. 17, other orders may be used. Blocks may be performed in parallel by combinatorial logic in the scheduler circuit 36. The scheduler circuit 36 may be configured to implement the operation shown in FIG. 17.

The scheduler circuit 36 may identify an op that is ready to issue and is selected for issue over any other ready ops (e.g. the oldest ready op in the op queue 38). If the ready op is not a vector mode op (decision block 150, "no" leg), the scheduler circuit 36 may not be able to fuse another op with the ready op and may issue the ready op without fusion (block 152). If the ready op is a vector mode op (decision block 150, "yes" leg), an op fusion with another vector mode op may be possible. If there is not another ready vector mode op (decision block 154, "no" leg) or if there is another ready vector mode op but it does not use a different row of the PEs 42 (decision block 154, "yes" leg and decision block 156, "no" leg), then a fusion is not possible and the scheduler circuit 36 may issue the ready op without fusion (block 152). If there is another ready vector op and the op uses a different row of PEs than the initial ready vector op (decision blocks 154 and 156, "yes" legs), then the scheduler circuit 36 may issue the fused ops (block 158).

In addition to the scheduler circuit 36 being designed to detect op fusion, some additional hardware circuits may be included as well to read the operands for the two vector ops from the data buffer 40 and to route the operands to the correct rows of the PEs 42. The wiring for op fusion is illustrated in FIG. 4 above.

Figure 18:
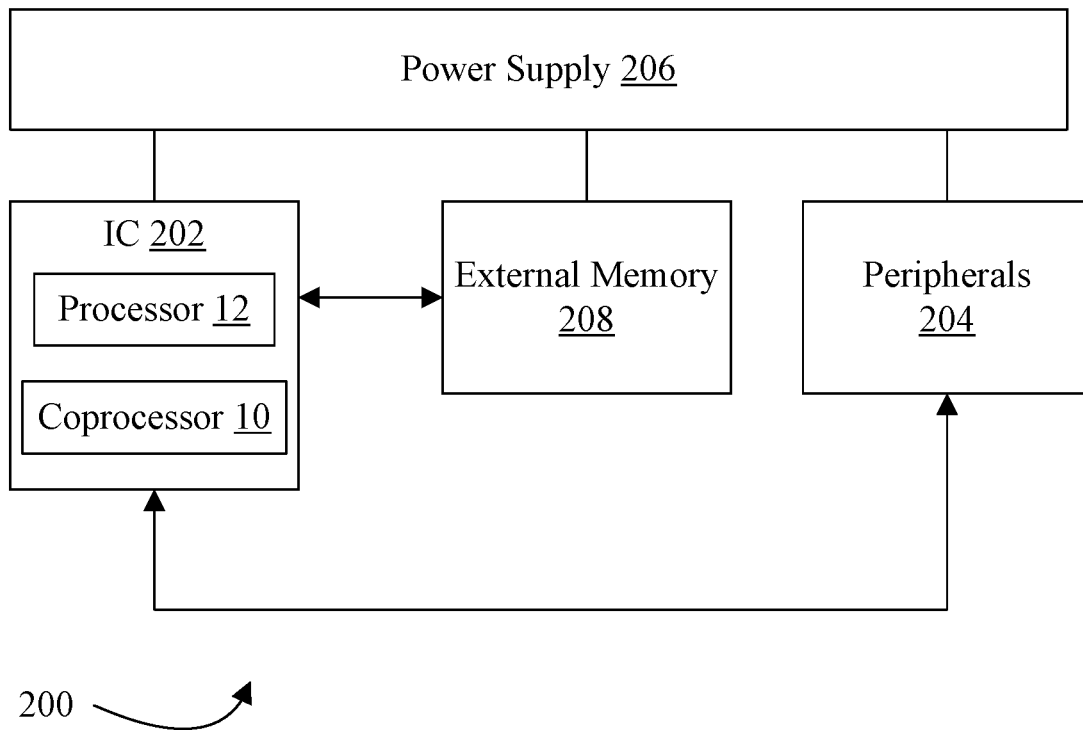
FIG. 18 is a block diagram of one embodiment of a system including the processor and the coprocessor.

FIG. 18 is a block diagram of one embodiment of a system 200. In the illustrated embodiment, the system 200 includes at least one instance of an integrated circuit (IC) 202 coupled to one or more peripherals 204 and an external memory 208. A power supply 206 is provided which supplies the supply voltages to the IC 202 as well as one or more supply voltages to the memory 208 and/or the peripherals 204. The IC 202 may include one or more instances of the CPU processor 12 and one or more instances of the coprocessor 10. In other embodiments, multiple ICs may be provided with instances of the CPU processor 12 and/or the coprocessor 10 on them.

The peripherals 204 may include any desired circuitry, depending on the type of system 200. For example, in one embodiment, the system 200 may be a computing device (e.g., personal computer, laptop computer, etc.), a mobile device (e.g., personal digital assistant (PDA), smart phone, tablet, etc.), or an application specific computing device capable of benefitting from the coprocessor 10 (e.g., neural networks, LSTM networks, other machine learning engines including devices that implement machine learning, etc.). In various embodiments of the system 200, the peripherals 204 may include devices for various types of wireless communication, such as wifi, Bluetooth, cellular, global positioning system, etc. The peripherals 204 may also include additional storage, including RAM storage, solid state storage, or disk storage. The peripherals 204 may include user interface devices such as a display screen, including touch display screens or multitouch display screens, keyboard or other input devices, microphones, speakers, etc. In other embodiments, the system 200 may be any type of computing system (e.g. desktop personal computer, laptop, workstation, net top etc.).

The external memory 208 may include any type of memory. For example, the external memory 208 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 208 may include one or more memory modules to which the memory devices are mounted, such as single inline memory modules (SIMMs), dual inline memory modules (DIMMs), etc. Alternatively, the external memory 208 may include one or more memory devices that are mounted on the IC 202 in a chip-on-chip or package-on-package implementation.

Figure 19:
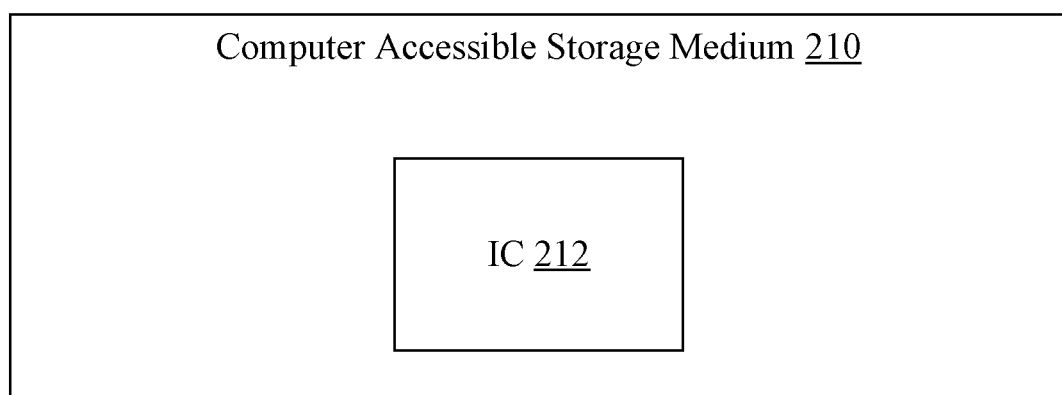
FIG. 19 is a block diagram of one embodiment of a computer accessible storage medium.

FIG. 19 is a block diagram of one embodiment of a computer accessible storage medium 210 is shown storing an electronic description of the IC 202 (reference numeral 212). More particularly, the description may include at least the coprocessor 10 and/or the CPU processor 12. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 210 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 212 of the IC 202 stored on the computer accessible storage medium 210 may be a database which can be read by a program and used, directly or indirectly, to fabricate the hardware comprising the IC 202. For example, the description may be a behavioral-level description or register-transfer level (RTL)

description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the IC 202. The netlist may then be placed and routed to produce a data set describing geometric shapes to be applied to masks. The masks may then be used in various semiconductor fabrication steps to produce a semiconductor circuit or circuits corresponding to the IC 202. Alternatively, the description 212 on the computer accessible storage medium 210 may be the netlist (with or without the synthesis library) or the data set, as desired.

While the computer accessible storage medium 210 stores a description 212 of the IC 202, other embodiments may store a description 212 of any portion of the IC 202, as desired (e.g. the coprocessor 10 and/or the CPU processor 12, as mentioned above).

Numerous variations and modifications will become apparent to those skilled in the art once the above disclosure is fully appreciated. It is intended that the following claims be interpreted to embrace all such variations and modifications.

What is claimed is:

1. A coprocessor comprising:
   a queue configured to store operations awaiting execution in a plurality of processing elements, wherein dependencies among the operations awaiting execution are determined responsive to at least one value computed for each respective operation, and wherein the at least one value comprises a mask that is applied to a destination identifier for each operation, wherein the mask is based on an operand size of the respective operation; and
   wherein the plurality of processing elements are arranged in a grid of one or more rows and one or more columns, wherein a given processing element of the plurality of processing elements comprises:
      a multiply-accumulate circuit configured to multiply a plurality of first input operands and sum a result of the multiplication with a second input operand responsive to an operation issued to the plurality of processing elements from the queue; and
      a first memory coupled to the multiply-accumulate circuit, wherein the first memory is configured to store results generated by the given processing element, wherein the first memory comprises a portion of a result memory implemented by the coprocessor, wherein locations in the result memory are specifiable as destination operands of instructions executable by the coprocessor, and wherein the portion of the result memory implemented by the first memory is the portion of the result memory that the given processing element is capable of updating.

2. The coprocessor as recited in claim 1 wherein other ones of the plurality of processing elements are not capable of updating the portion of the of the result memory implemented in a first processing element of the processing elements.

3. The coprocessor as recited in claim 1 wherein a dependency between a first operation and a second operation is determined by logically combining the masks for the first operation and the second operation to generate a combined mask, masking the destination identifiers for the first operation and the second operation with the combined mask, and comparing the masked destination identifiers.

4. The coprocessor as recited in claim 3 wherein equality of the masked destination identifiers indicates a dependency between the first operation and the second operation.

5. The coprocessor as recited in claim 1 wherein the second input operand is read from the first memory, and the locations in the first memory store accumulated results of multiply-accumulate operations.

6. The coprocessor as recited in claim 1 wherein a given instruction is defined to update a plurality of the locations physically distributed to at least a subset of the plurality of processing elements.

7. The coprocessor as recited in claim 6 wherein the plurality of the locations are physically distributed to each of the plurality of processing elements.

8. The coprocessor as recited in claim 1 further comprising decode circuit configured to decode a first instruction that moves data between the result memory and a main memory system, wherein the decode circuit is configured to decode the first instruction into: (i) a move operation between the first memory of one or more of the plurality of processing elements and a temporary register; and (ii) a second operation that moves the data between the temporary register and the main memory system.

9. The coprocessor as recited in claim 8 wherein the first instruction is a first store instruction that stores data from the result memory to the main memory, and wherein the move operation moves data from the first memory to the temporary register, and wherein the second operation is a second store operation that writes the temporary register data to the main memory.

10. The coprocessor as recited in claim 8 wherein the first instruction is a first load instruction that loads data from the main memory to the result memory, and wherein the second operation is a second load operation that reads data from the main memory and writes the data to the temporary register, and wherein the move operation moves data from the temporary register to the first memory.

11. A coprocessor comprising:
    a queue configured to store operations awaiting execution in a plurality of processing elements, wherein dependencies among the operations awaiting execution are determined responsive to at least one value computed for each respective operation; and
    wherein the plurality of processing elements are arranged in a grid of one or more rows and one or more columns, and wherein a given processing element of the plurality of processing elements comprises:
      a multiply-accumulate circuit configured to multiply a plurality of first input operands and sum a result of the multiplication with a second input operand responsive to an operation issued to the plurality of processing elements from the queue; and
      a first memory coupled to the multiply-accumulate circuit, wherein the first memory is configured to store results generated by the given processing element, wherein the first memory comprises a portion of a result memory implemented by the coprocessor, wherein locations in the result memory are specifiable as destination operands of instructions executable by the coprocessor, and wherein the portion of the result memory implemented by the first memory is the portion of the result memory that the given processing element is capable of updating, and wherein the at least one value comprises a first row mask identifying which rows of the grid include processing elements that execute for the respective operation, and wherein the at least one value comprises a second row mask identifying which rows in the first memory in each processing element are accessed during execution of the respective operation.

12. The coprocessor as recited in claim 11 wherein a dependency between a first operation and a second operation is determined by logically combining the first row masks for the first operation and the second operation to generate a first combined mask, logically combining the second row masks for the first operation and the second operation to generate a second combined mask, and detecting a dependency if there is at least one set bit in the first combined mask and at least one set bit in the second combined mask.

13. The coprocessor as recited in claim 11 wherein the second input operand is read from the first memory, and the locations in the first memory store accumulated results of multiply-accumulate operations.

14. The coprocessor as recited in claim 11 wherein a given instruction is defined to update a plurality of the locations physically distributed to at least a subset of the plurality of processing elements.

15. The coprocessor as recited in claim 14 wherein the plurality of the locations are physically distributed to each of the plurality of processing elements.

16. The coprocessor as recited in claim 11 further comprising decode circuit configured to decode a first instruction that moves data between the result memory and a main memory system, wherein the decode circuit is configured to decode the first instruction into: (i) a move operation between the first memory of one or more of the plurality of processing elements and a temporary register; and (ii) a second operation that moves the data between the temporary register and the main memory system.

17. The coprocessor as recited in claim 16 wherein the first instruction is a first store instruction that stores data from the result memory to the main memory, and wherein the move operation moves data from the first memory to the temporary register, and wherein the second operation is a second store operation that writes the temporary register data to the main memory.

18. A coprocessor comprising:
 a decode circuit configured to decode a first instruction that moves data between a result memory and a main memory system, wherein the decode circuit is configured to decode the first instruction into: (i) a move operation between a first memory and one or more of a plurality of processing elements and a temporary register; and (ii) a second operation that moves the data between the temporary register and the main memory system; and wherein the plurality of processing elements are arranged in a grid of one or more rows and one or more columns, wherein a given processing element of the plurality of processing elements comprises:
 a multiply-accumulate circuit configured to multiply a plurality of first input operands and sum a result of the multiplication with a second input operand responsive to an operation issued to the plurality of processing elements; and
 a first memory coupled to the multiply-accumulate circuit, wherein the first memory is configured to store results generated by the given processing element, wherein the first memory comprises a portion of the result memory implemented by the coprocessor, wherein locations in the result memory are specifiable as destination operands of instructions executable by the coprocessor, and wherein the portion of the result memory implemented by the first memory is the portion of the result memory that the given processing element is capable of updating.

19. The coprocessor as recited in claim 18 wherein the first instruction is a first store instruction that stores data from the result memory to the main memory, and wherein the move operation moves data from the first memory to the temporary register, and wherein the second operation is a second store operation that writes the temporary register data to the main memory.

20. The coprocessor as recited in claim 18 wherein the first instruction is a first load instruction that loads data from the main memory to the result memory, and wherein the second operation is a second load operation that reads data from the main memory and writes the data to the temporary register, and wherein the move operation moves data from the temporary register to the first memory.

\* \* \* \* \*